(12) United States Patent
Kawashima

(10) Patent No.: US 11,343,386 B2
(45) Date of Patent: May 24, 2022

(54) SCAN SYSTEM OPERABLE BY A WEB APPLICATION LINKED WITH A MESSAGE SHARING SYSTEM, IMAGE PROCESSING APPARATUS, METHOD, AND PROGRAM STORAGE MEDIUM

(71) Applicant: CANON KABUSHIKI KAISHA, Tokyo (JP)

(72) Inventor: Yasuaki Kawashima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/144,239

(22) Filed: Jan. 8, 2021

(65) Prior Publication Data
US 2021/0250450 A1 Aug. 12, 2021

(30) Foreign Application Priority Data
Feb. 12, 2020 (JP) .............................. JP2020-021869

(51) Int. Cl.
*H04N 1/00* (2006.01)
*H04L 51/046* (2022.01)
*H04L 51/02* (2022.01)

(52) U.S. Cl.
CPC ......... *H04N 1/00225* (2013.01); *H04L 51/02* (2013.01); *H04L 51/046* (2013.01); *H04N 1/00214* (2013.01)

(58) Field of Classification Search
CPC ............ H04N 1/0022; H04N 1/00214; H04N 1/00225; H04N 1/00228; H04N 1/32776; H04N 2201/00758; H04L 51/02
USPC .................................................. 358/402, 474
See application file for complete search history.

(56) References Cited

U.S. PATENT DOCUMENTS 9,749,480 B1 * 8/2017 Katano .............. H04N 1/00241
2019/0079650 A1 * 3/2019 Tokuchi .................. H04L 51/22

FOREIGN PATENT DOCUMENTS

JP 2019144698 A 8/2019

* cited by examiner

*Primary Examiner* — Kent Yip
(74) *Attorney, Agent, or Firm* — Rossi, Kimms & McDowell LLP

(57) ABSTRACT

A web application of a scan system provides confirmation data associated with a scan data destination to a post source of a scan-related message through a message sharing system. An image processing apparatus transmits scan data and the input confirmation data to the web application. When the input data transmitted from the image processing apparatus is stored as the confirmation data in the storage, the web application posts the scan data to the destination associated with the confirmation data using the message sharing system.

10 Claims, 28 Drawing Sheets

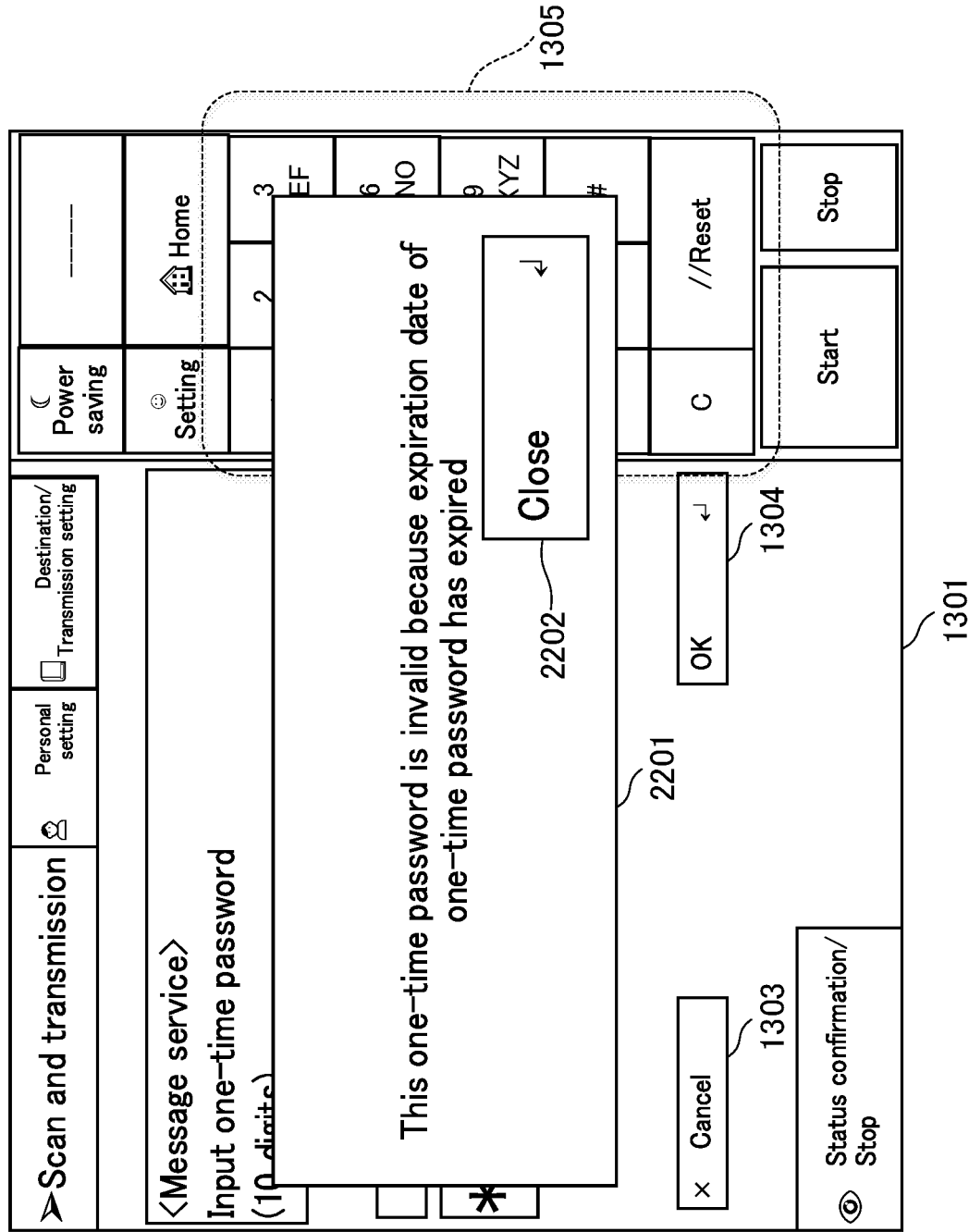

SCAN SYSTEM OPERABLE BY A WEB APPLICATION LINKED WITH A MESSAGE SHARING SYSTEM, IMAGE PROCESSING APPARATUS, METHOD, AND PROGRAM STORAGE MEDIUM

BACKGROUND OF THE INVENTION

Field of the Invention

The present invention relates to a scan system, an image processing apparatus, a method, and a program storage medium.

Description of the Related Art

The use of message applications for so-called chat in which messages are exchanged between a plurality of user terminals over a network is widespread. Furthermore, the number of services in which Bot applications which automatically respond to messages in accordance with the contents of messages transmitted by users on message applications are utilized have also increased.

For example, Japanese Patent Laid-Open No. 2019-144698 proposes that a print instruction be provided to a printing apparatus on a network through a message application in a cloud print service linked with a Bot application.

However, Japanese Patent Laid-Open No. 2019-144698 does not describe a process of performing a scan through a message application.

SUMMARY OF THE INVENTION

A scan system in an embodiment of the present invention is a scan system which includes a computer configured to execute a web application linked with a message sharing system and an image processing apparatus including a scanner. The computer includes: a memory storing instructions; and a processor executing first instructions causing the computer to: issue confirmation data in response to a scan request generated on the basis of posting of a scan-related message from a user account belonging to the message sharing system; receive, as a destination to which scan data generated on the basis of a scan is transmitted, a designation of a communication space in the message sharing system or a direct message to the user account belonging to the message sharing system; store the destination associated with the confirmation data in a storage; and provide the confirmation data to a poster of the scan-related message through the message sharing system. The image processing apparatus includes: receiving an input of confirmation data from a user to post scan data generated on the basis of a scan to the message sharing system; transmitting the input data to the computer; and transmitting scan data generated on the basis of a scan to the web application. The first instructions further cause the computer to: when the input data transmitted from the image processing apparatus is stored as the confirmation data in the storage, post the scan data transmitted from the image processing apparatus to the destination associated with the confirmation data using the message sharing system.

Another embodiment of the present invention is an image processing apparatus including a scanner. The image processing apparatus includes: a memory storing instructions; and a processor executing instructions causing the image processing apparatus to: receive an input of confirmation data from a user to post scan data generated on the basis of a scan to the message sharing system; transmit the input data to a web application linked with the message sharing system; and transmit scan data generated on the basis of a scan to the web application. When the input data transmitted from the image processing apparatus is stored as the confirmation data in a storage, the web application posts the scan data transmitted from the image processing apparatus to the destination associated with the confirmation data using the message sharing system. The destination is the designation of a communication space in the message sharing system or a direct message to a user account belonging to the message sharing system.

Further features of the present invention will become apparent from the following description of exemplary embodiments with reference to the attached drawings.

BRIEF DESCRIPTION OF THE DRAWINGS

FIG. 27 is a diagram illustrating an example of an error display when an expiration date of a one-time password has expired.

DESCRIPTION OF THE EMBODIMENTS

Embodiments for carrying out the present invention will be described below with reference to the drawings and the like. Here, not all of the features described in the following embodiments are essential to the present invention.

First Embodiment

In a first embodiment, an example of service in which an image processing apparatus is linked with a Bot application used in a message sharing system will be described. In this service, a user transmits a scan request from a message application and a scanned image is transmitted from the image processing apparatus to the message application over a network.

Figure 1:
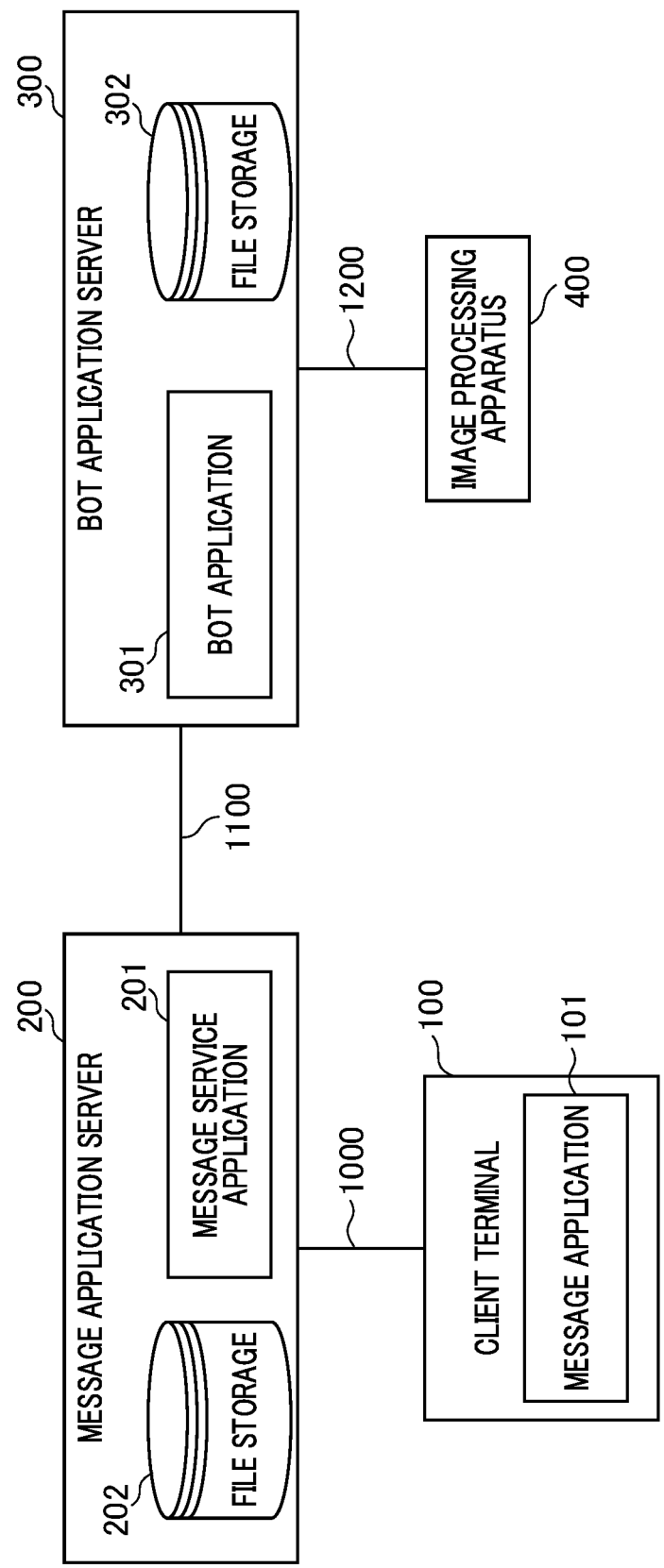
FIG. 1 is a diagram illustrating an example of a configuration of a system in a first embodiment.

FIG. 1 is a diagram illustrating an example of a configuration of a system in the first embodiment. A scan system in the first embodiment includes a client terminal 100, a message application server 200, a Bot application server 300, and an image processing apparatus 400. In FIG. 1, the message application server 200 is connected to the client terminal 100 via a network 1000 and is connected to the Bot application server 300 via a network 1100.

Here, in the message application according to the first embodiment, transmission and reception to/from other client terminals are also possible through the message application server 200. Although one client terminal 100 is illustrated in the example of FIG. 1, a plurality of client terminals 100 may be provided in the scan system. In this case, configurations of hardware in the plurality of client terminals may be different.

Also, the Bot application server 300 and the image processing apparatus 400 are connected to each other to be able to communicate with each other over a network 1200. The networks 1000, 1100, and 1200 may be networks of any specifications as long as data can be transmitted.

The client terminal 100 is a computer apparatus operated by a user, and examples thereof include a personal computer (PC), a smartphone, a tablet terminal, and the like. The client terminal 100 includes a message application 101 that is a software module allowing the message sharing system to be used.

The message application 101 has a function of transmitting a message including a character string input by a user to a message service application 201 which will be described later over the network 1000. Furthermore, the message application 101 has a function of notifying the user of the message received from the message service application 201 over the network 1000.

The message application server 200 is a server installed to provide the service of the message sharing system to the message application 101. The message application server 200 includes the message service application 201 that is a software module and a file storage 202. Although not shown in FIG. 1, the message application server 200 performs message relay processing when messages are exchanged between a plurality of client terminals.

The message service application 201 receives the message transmitted from the message application 101 of the client terminal 100.

Also, the message service application 201 transmits a message reception event to a Bot application 301 which will be described later of the Bot application server 300. Furthermore, the message service application 201 transmits a message to the message application 101 on the basis of a request from the Bot application 301. In addition, the message service application 201 performs a process of storing the received image file in the file storage 202.

The file storage 202 is a storage apparatus managed using the message application server 200. The file storage 202 stores an image file transmitted from the message application 101 of the client terminal 100 and an image file and a message sent from the Bot application 301.

The Bot application server 300 is a server installed to provide a function of the Bot application 301 linked with the message sharing system. The Bot application server 300 includes the Bot application 301 that is an example of a web application and the file storage 302.

The Bot application 301 receives an event notification from the message service application 201 of the message application server 200 and performs processing according to the content of the received event. Furthermore, the Bot application 301 transmits a message transmission request to the message service application 201 over the network 1100 as necessary.

If the received event is a scan request, the Bot application 301 issues a uniquely identifiable one-time password for the scan request. The one-time password is an example of confirmation data.

Also, the Bot application 301 transmits a message transmission request including a uniquely identifiable one-time password to a user who has performed the request. Here, an expiration date is provided in the one-time password to enhance the security of authentication in which the one-time password is used. If the expiration date passes a valid period thereof, generally, the one-time password is invalid. Although a description will be provided under the assumption that, for this reason, when a one-time password is issued, an expiration date is also set in accordance with this in the first embodiment, this assumption does not limit the present invention.

Also, the Bot application 301 functions as a virtual user of the message service application 201 and can transmit and receive messages to and from the message application 101 of the client terminal 100.

The file storage 302 stores an image file or a message received from the image processing apparatus 400. When transmission destination information (a destination) of an image file is included in the scan request, the file storage 302 holds the one-time password issued by the Bot application 301 and the requested user information associated with the transmission destination information as well.

Here, although a configuration in which the Bot application 301 is installed in the Bot application server 300 is provided in the first embodiment, the Bot application 301 may be configured to be installed in the image processing apparatus 400.

Also, the Bot application 301 is configured to be able to issue a print request as well in response to a post related to printing in addition to a scan request in response to a post related to scanning to the image processing apparatus 400.

The image processing apparatus 400 is an apparatus having the scanner apparatus, and corresponds to, for example, a multifunction peripheral (MFP), a desktop scanner, and the like. The image processing apparatus 400 has a scanning function of scanning a document with the scanner apparatus. The image processing apparatus 400 may have a printing apparatus configured to form an image on paper using a recording agent such as toner or ink or may have functions such as copying and FAX transmission.

Figure 2:
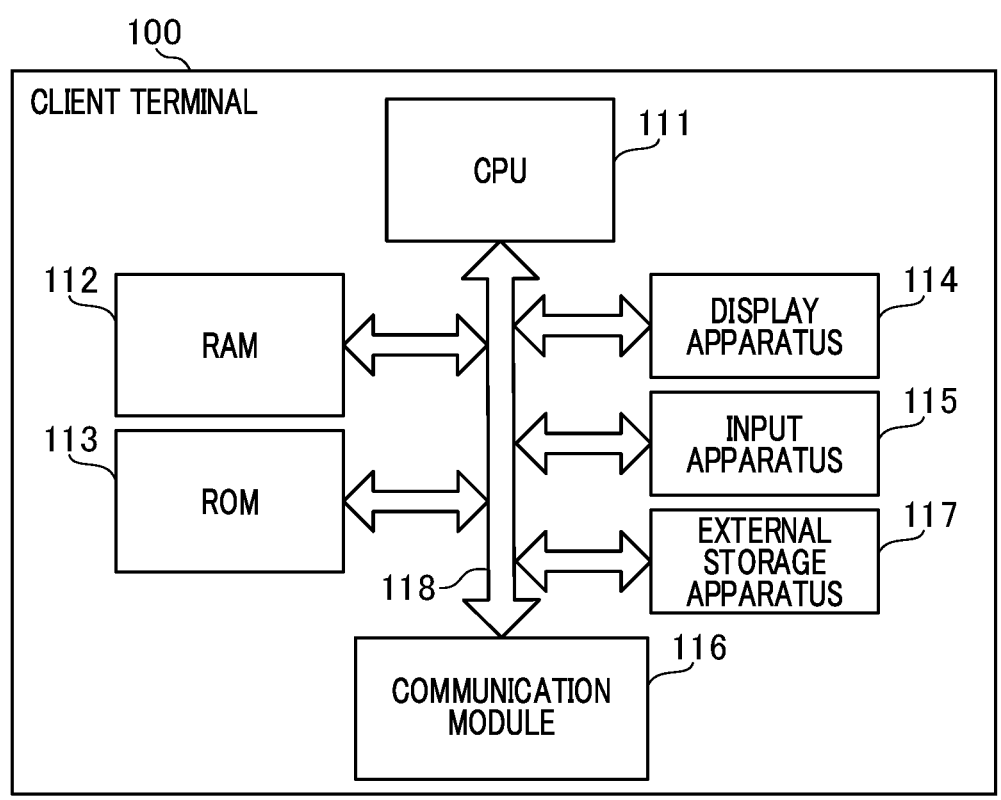
FIG. 2 is a diagram illustrating an example of a configuration of hardware of a client terminal in the first embodiment.

FIG. 2 is a diagram illustrating an example of a configuration of hardware of the client terminal 100 according to the first embodiment.

The client terminal 100 includes a CPU 111, a RAM 112, a ROM 113, a display apparatus 114, an input apparatus 115, a communication module 116, and the external storage apparatus 117. These constituent elements are connected to each other through a system bus 118 and exchange data with each other.

The CPU is an abbreviation for a central processing unit, the RAM is an abbreviation for a random access memory, and the ROM is an abbreviation for a read only memory.

The CPU 111 performs various arithmetic processes in accordance with the program stored in the RAM 112 or the ROM 113. The RAM 112 is a volatile storage region and is used as a temporary storage region when the CPU 111 performs various arithmetic processes. The ROM 113 is a non-volatile storage region having an operating system (OS), the message application 101, and other applications stored therein.

The display apparatus 114 is a device configured to display a graphic user interface (GUI) or the like and includes, for example, a liquid crystal display and a graphic controller.

The input apparatus 115 is a device configured to receive an operation of a user performed on the client terminal 100 and examples thereof include a keyboard and a pointing device. The client terminal 100 performs various controls in response to various instructions of the user received from the input apparatus 115.

Here, the input apparatus 115 may be a device externally attached to the client terminal 100. Furthermore, in the example of FIG. 2, the display apparatus 114 and the input apparatus 115 are shown separately in the client terminal 100. However, for example, the display apparatus 114 and the input apparatus 115 may be configured as one module such as a touch panel display.

The communication module 116 is an interface configured to communicate with an external apparatus. The communication module 116 is connected to a communication machine (not shown) such as a router and performs data communication with the message application server 200 over the network 1000. This data communication may be performed through, for example, communication using a wireless line or may be performed through communication using a wired line such as a telephone line or a LAN line.

The external storage apparatus 117 is a non-volatile storage region. For example, when the client terminal 100 is a smartphone, a flash memory may be used as the external storage apparatus 117.

Figure 3:
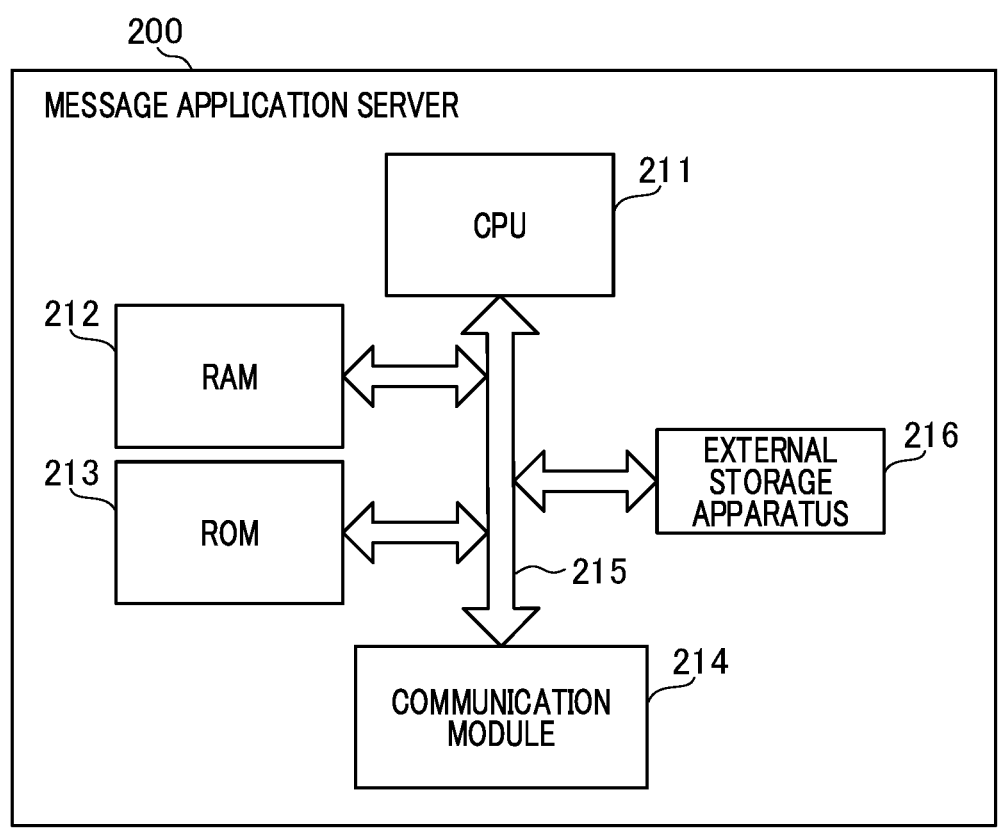
FIG. 3 is a diagram illustrating an example of a configuration of hardware of a message application server in the first embodiment.

FIG. 3 is a diagram illustrating an example of a configuration of hardware of the message application server 200 in the first embodiment.

The message application server 200 includes a CPU 211, a RAM 212, a ROM 213, a communication module 214, and an external storage apparatus 216. These constituent elements are connected to each other through the system bus 215 and exchange data with each other.

The CPU 211 performs various arithmetic processes in accordance with the program stored in the RAM 212 or the ROM 213. The RAM 212 is a volatile storage region and is used as a temporary storage region when the CPU 211 performs various arithmetic processes. The ROM 213 is a non-volatile storage region and stores various data.

The communication module 214 is an interface configured to communicate with an external apparatus. The communication module 214 performs data communication with the client terminal 100 over the network 1000 and performs data communication with the Bot application server 300 over the network 1100.

The external storage apparatus 216 is a non-volatile storage region and is used for storing, for example, the operating system, the message service application 201, and the like.

Also, a configuration of hardware of the Bot application server 300 is the same as that of the message application server 200 described above except for the following points. In the Bot application server 300, the Bot application 301 is stored in the external storage apparatus. Furthermore, the communication module of the Bot application server 300 performs data communication with the message application server 200 over the network 1100 and performs data communication with the image processing apparatus 400 over the network 1200.

For this reason, the description of the hardware configuration of the Bot application server 300 will be omitted.

A configuration of each server is not limited to the above and may be, for example, the same configuration as a general information processing apparatus, or each server may have a different configuration.

Figure 4:
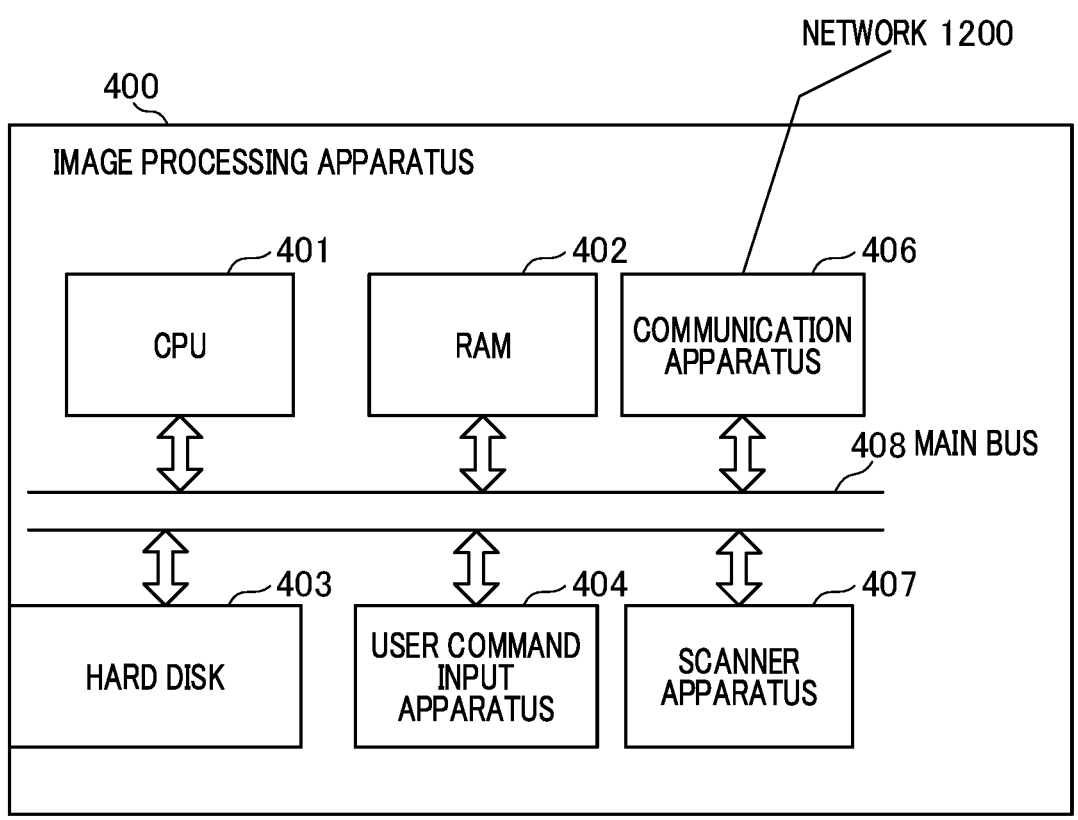
FIG. 4 is a diagram illustrating an example of a configuration of hardware of an image processing apparatus in the first embodiment.

FIG. 4 is a diagram illustrating an example of a configuration of hardware of the image processing apparatus 400 in the first embodiment.

The image processing apparatus 400 includes a CPU 401, a RAM 402, a hard disk (hereinafter also referred to as an "HDD") 403, an input apparatus 404, a communication apparatus 406, and a scanner apparatus 407. These constituent elements are connected to each other through a main bus 408 and exchange data with each other.

The CPU 401 performs various arithmetic processes in accordance with the program stored in the RAM 402 or the HDD 403. In the first embodiment, unless otherwise specifically stated, in the image processing apparatus 400, the CPU 401 controls the RAM 402, the HDD 403, the input apparatus 404, the communication apparatus 406, and the scanner apparatus 407 through the main bus 408.

The image processing apparatus 400 has an application program configured to receive an input of a one-time password which will be described later installed therein to post scan data generated on the basis of the scan to the message sharing system.

The RAM 402 is a volatile storage region and is used as a temporary storage region when the CPU 401 performs various arithmetic processes. The HDD 403 is a storage medium configured to store a program performed using the image processing apparatus 400. A non-volatile random access memory (NVRAM) may be used instead of the HDD 403.

The input apparatus 404 includes a display unit configured to provide a GUI to a user and receives various inputs of the user through the GUI. The communication apparatus 406 controls communication with the Bot application server 300 over the network 1200. The scanner apparatus 407 optically reads out a document and generates an electronic file (scan data) based on the scan.

Figure 5:
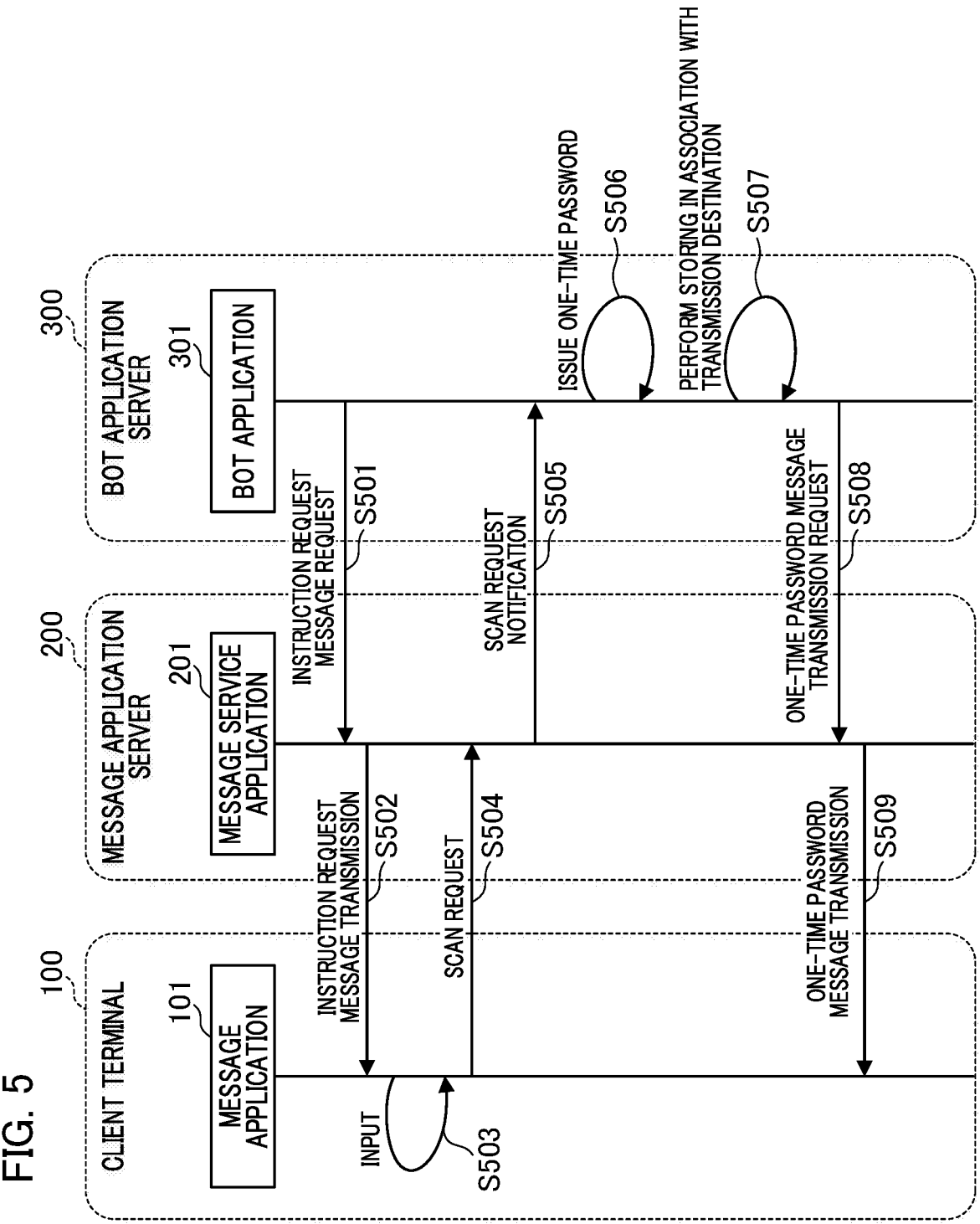
FIG. 5 is a diagram illustrating an example of a process of generating a one-time password in the first embodiment.

FIG. 5 is a diagram illustrating an example of a process of generating a one-time password in the first embodiment. In the process of FIG. 5 is started, for example, when a user requests the generation of the one-time password from the client terminal 100 through the following procedure.

Figure 6:
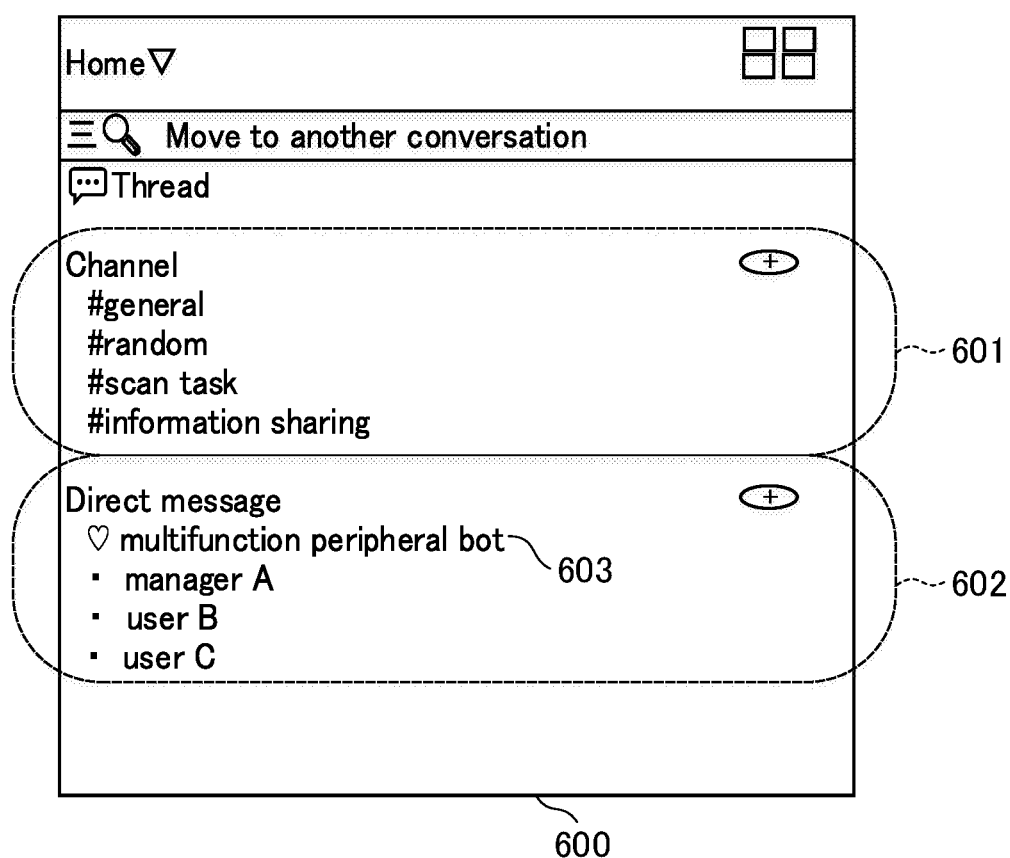
FIG. 6 is a diagram illustrating an example of the home screen of a message application.

FIG. 6 is a diagram illustrating an example of a home screen 600 of the message application 101. The home screen 600 of the message application 101 includes the display of a channel list display unit 601 and a user list display unit 602.

The channel list display unit 601 displays a list of channels to which operating users belong among channels configured to share messages with other users. The user list display unit 602 displays a list of users who can directly exchange messages. A Bot account (a multifunction peripheral Bot 603) is displayed on the user list display unit 602 illustrated in FIG. 6, as a user who can directly exchange messages. The Bot account (the multifunction peripheral Bot 603) is a virtual user registered in the message sharing system and provides a response to the message sharing system using the Bot application 301. A user can select the multifunction peripheral Bot 603 as a user who can directly exchange messages in the message application 101.

Figure 7:
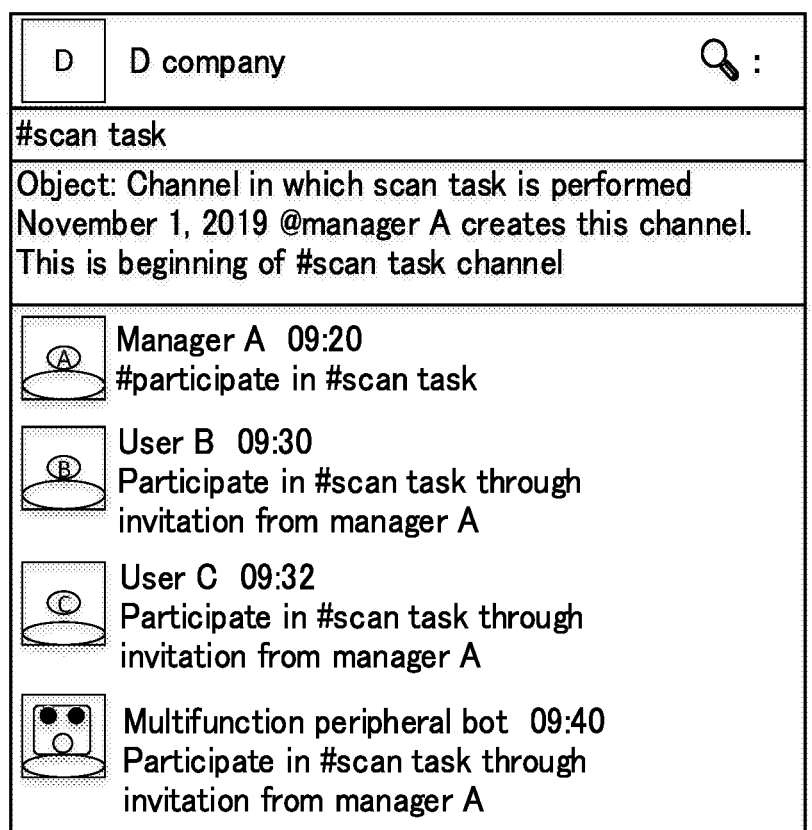
FIG. 7 is a diagram illustrating an example of a channel screen of the message application.

FIG. 7 is a diagram illustrating an example of a channel screen 700 of the message application 101. The channel screen 700 of FIG. 7 is displayed in response to an operation of selecting a "channel" from the channel list display unit 601 of the home screen 600 of FIG. 6.

The channel is an example of a communication space used in a chat function for sharing a message with a plurality of user accounts in the message sharing system. Examples of this type of communication space includes a channel in Slack, a group chat in Chatwork, a group talk in LINE, and the like.

Figure 8:
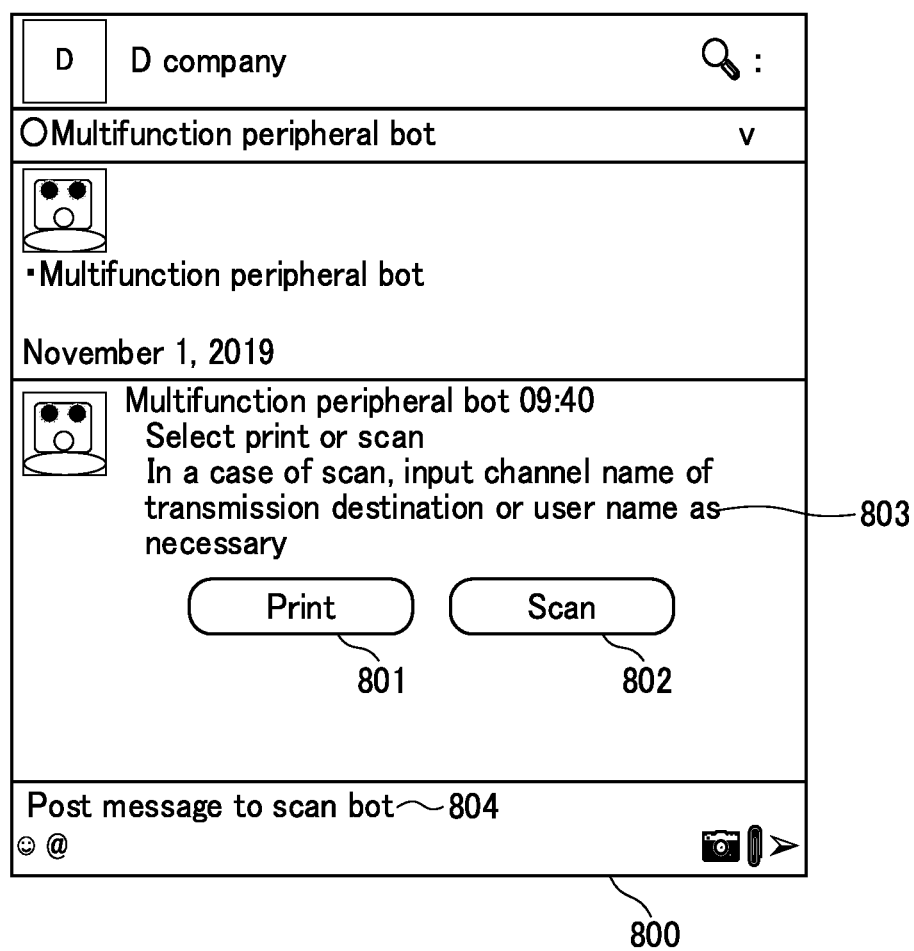
FIG. 8 is a diagram illustrating an example of a message exchange screen with a multifunction peripheral Bot.

FIG. 8 is a diagram illustrating an example of a message exchange screen 800 with a multifunction peripheral Bot in the message application 101. The message exchange screen 800 of FIG. 8 is displayed in response to an operation of selecting the "multifunction peripheral Bot 603" that is a virtual user from the user list display unit 602 of the home screen 600 of FIG. 6.

The message exchange screen 800 of FIG. 8 includes, for example, a print instruction button 801 configured to provide a printing instruction, a scan instruction button 802 configured to provide a scanning instruction, an operation description message 803, and a display of a message input unit 804.

If the message exchange screen 800 of FIG. 8 is displayed, the client terminal 100 requests the generation of a one-time password. Thus, the process of FIG. 5 is started.

If the process of FIG. 5 is started, the Bot application 301 transmits a request for an instruction request message to the message service application 201 over the network 1100 (S501).

The message service application 201 transmits the instruction request message from the Bot account to the user account of the message application 101 over the network 1000 upon receiving the request of the instruction request message (S502). As an example, the instruction request message is presented to a user as the message exchange screen 800 including the print instruction button 801, the scan instruction button 802, and the message 803.

Here, a case in which the message application 101 receives the pressing of the print instruction button 801 will be described. If the print instruction button 801 is pressed, the message application 101 receives posting of image data to be printed. Furthermore, the message application 101 transmits a print request and image data to the message service application 201 over the network 1000.

Thus, the message service application 201 notifies the Bot application 301 of the request and causes the Bot application 301 to issue a one-time password for printing.

The message service application 201 acquires the issued one-time password and presents the one-time password to the user through the message application 101.

The user inputs the one-time password presented using the message application 101 in the image processing apparatus 400. Thus, image data posted using the message application 101 can be acquired and printed through the Bot application 301.

A description will be provided with reference to FIG. 5 again. The message application 101 in which the instruction request message has been received receives an input from the user (S503). The user inputs a channel name displayed on the channel list display unit 601 to the message input unit 804 as a transmission destination in accordance with the operation description message 803 as necessary and performs an operation of posting a message.

After that, if the scan instruction button 802 is pressed, the message application 101 transmits a scan request to the message service application 201 over the network 1000 (S504). Thus, a scan request based on the posting of a scan-related message from a user account belonging to the message sharing system is performed. When the user has input the channel name in S503 described above, the scan request transmitted in S504 also includes the channel name.

The message service application 201 notifies the Bot application 301 of the scan request upon receiving the scan request (S505).

The Bot application 301 issues a one-time password that makes the request uniquely identifiable and has a set expiration date (S506) upon receiving the scan request.

Although the one-time password may have any configuration, in this embodiment, an example in which the one-time password is composed of a 10-digit number will be described. Furthermore, in the following description, it is assumed that "1362325623" is issued as one-time password and one week after the issuance is set as the expiration date of the one-time password.

The Bot application 301 associates a transmission destination of the one-time password with the one-time password issued in S506 and records the association in the file storage 302 (S507). The transmission destination can select a communication space in the message sharing system or a direct message to a user account belonging to the message sharing system.

For example, if channel information that is a communication space in the message sharing system is transmitted in S503 described above, the channel is a transmission destination. If the above channel information is not transmitted, the user who transmits the scan request is a transmission destination and a direct message to the user account is transmitted.

In this embodiment, a case in which a user B performs the execution without transmitting the channel information will be described. In this case, no channel information has been transmitted. For this reason, the Bot application 301 in S507 records the user B who is an executor in the file storage 302 associated with a one-time password "1362325623", as a transmission destination.

After that, the Bot application 301 transmits a one-time password message transmission request to the message service application 201 (S508). The one-time password message transmission request includes an instruction used for transmitting a message including the one-time password to the transmission destination.

The message service application 201 transmits the one-time password message to the message application 101 upon receiving the transmission request of the one-time password message (S509).

Figure 9:
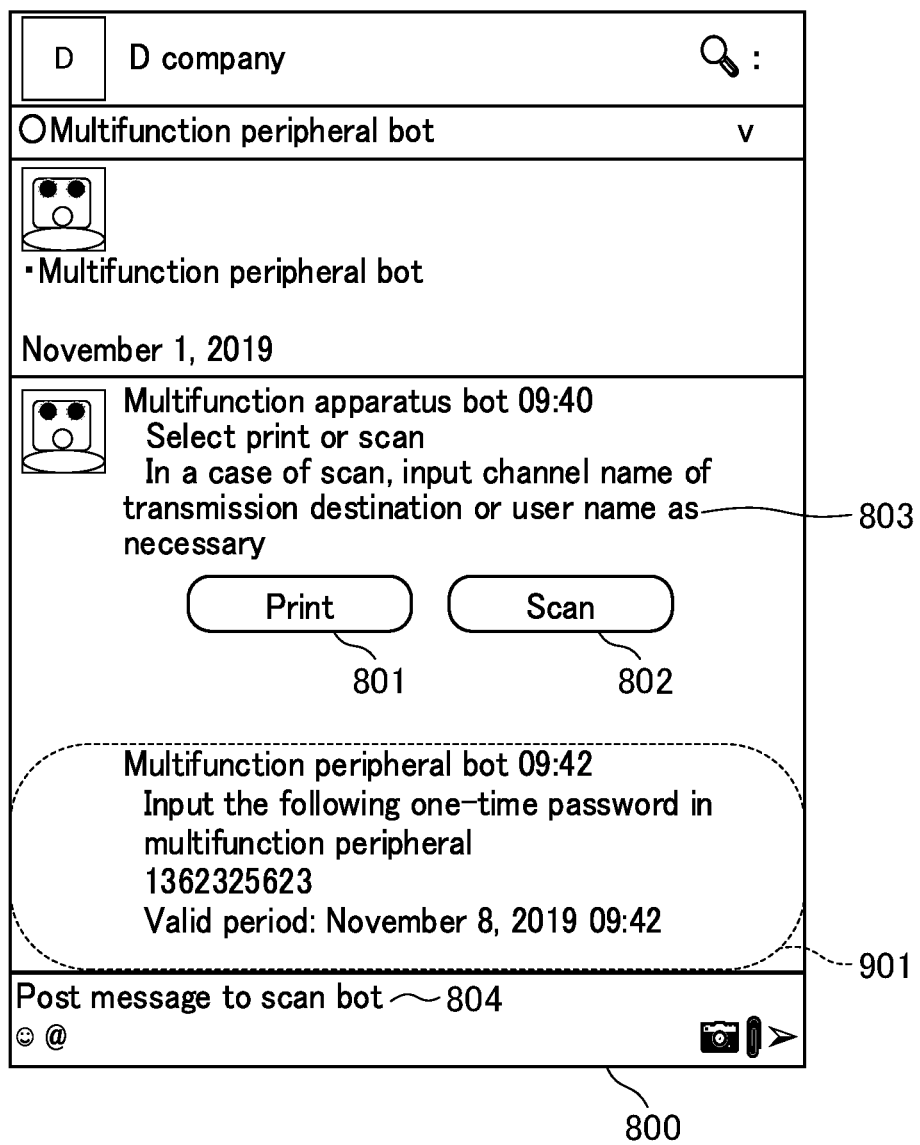
FIG. 9 is a diagram illustrating an example of a display of a one-time password message.

The message application 101 displays the one-time password message notification 901 illustrated in FIG. 9 using the Bot account upon receiving the one-time password message. The one-time password message notification 901 includes the one-time password, an expiration date thereof, and a message prompting the user to input a one-time password on the imaging device 400.

Thus, the one-time password is provided to a post source of a scan-related message.

Here, the description associated with FIG. 5 is finished.

Figure 10:
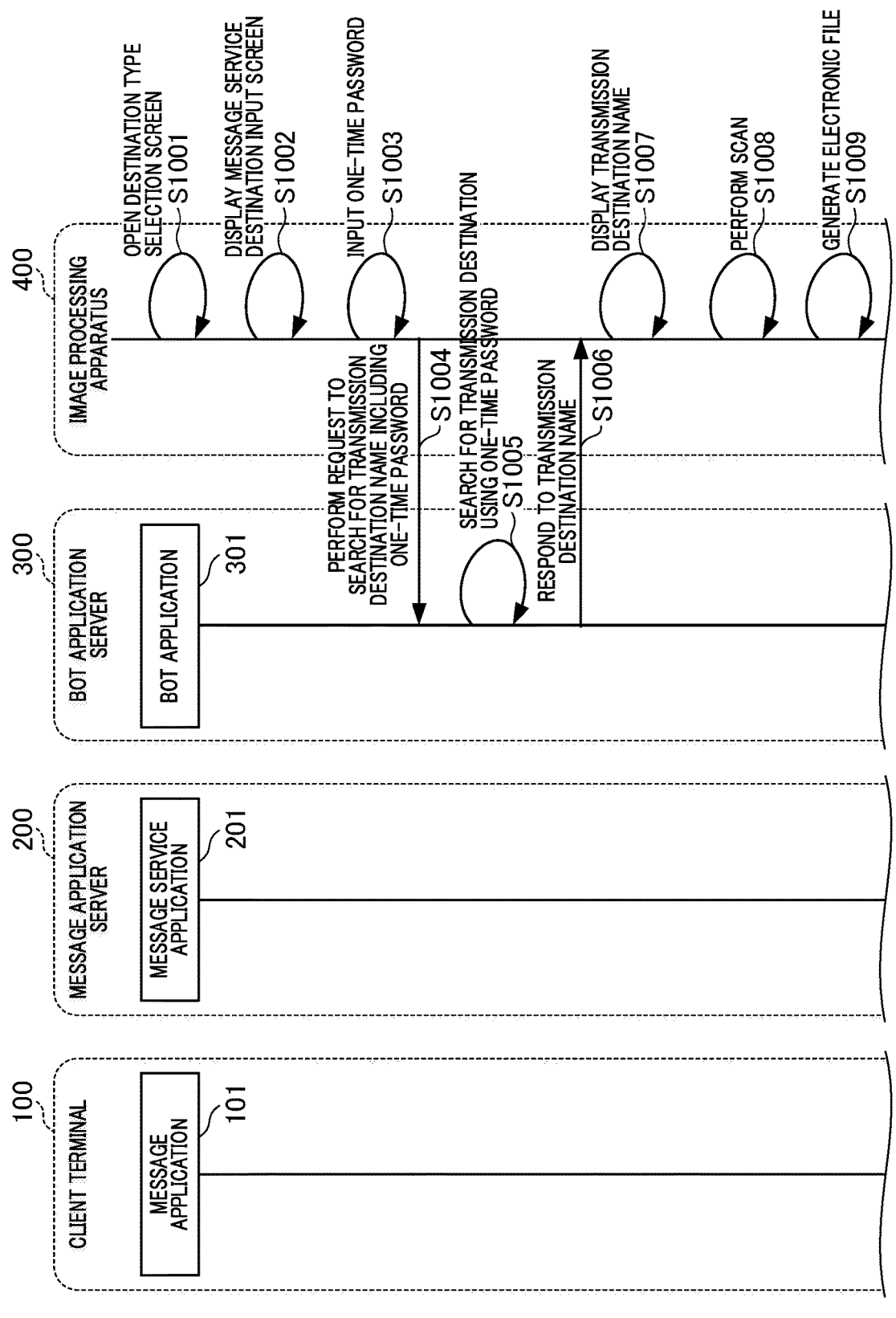
FIG. 10 is a diagram illustrating an example of scanning and transmission processing in the first embodiment.
Figure 11:
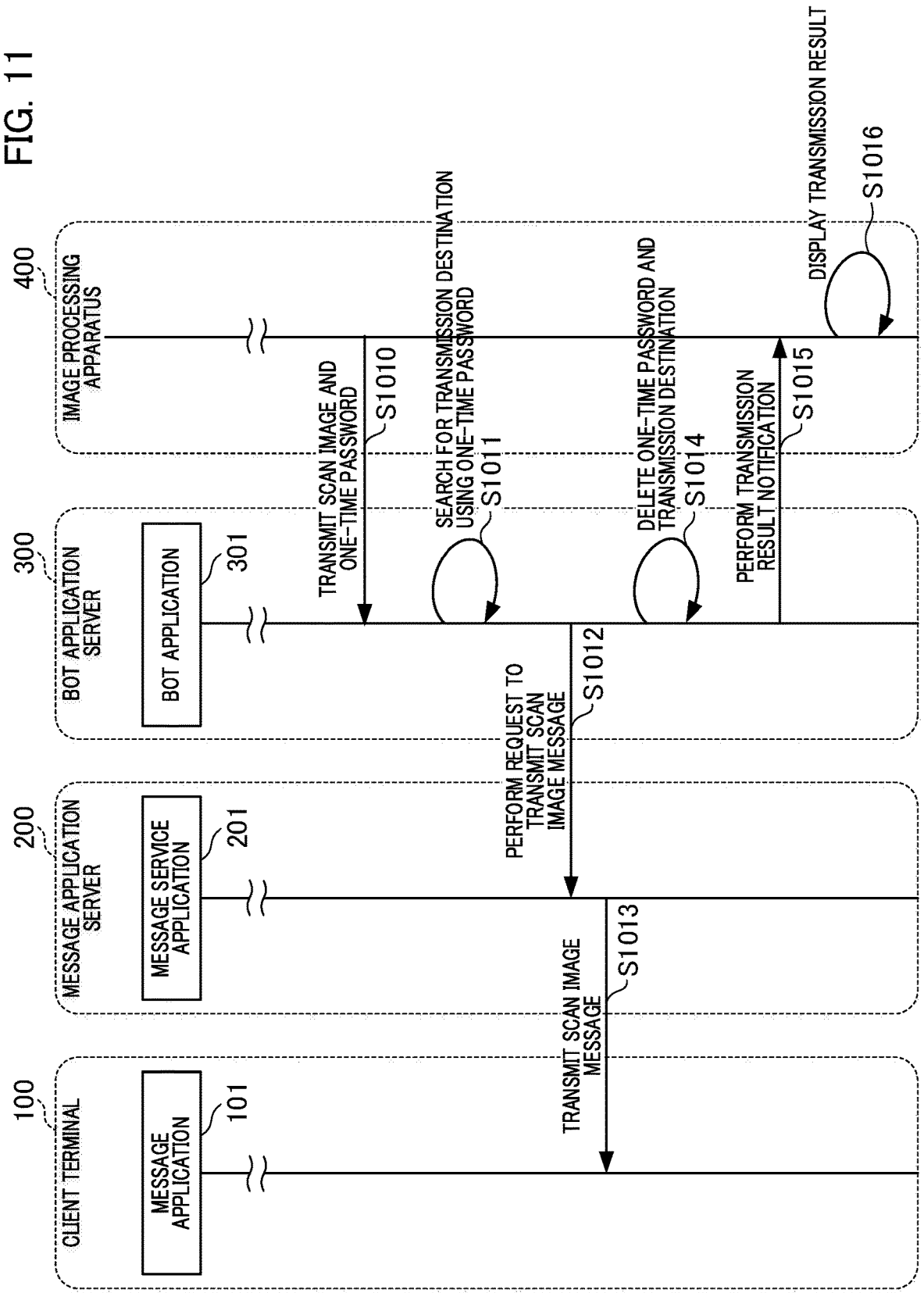
FIG. 11 is a diagram that is a continuation of FIG. 10.

FIGS. 10 and 11 are diagrams illustrating an example of the scanning and transmission processing in the first embodiment.

Figure 12:
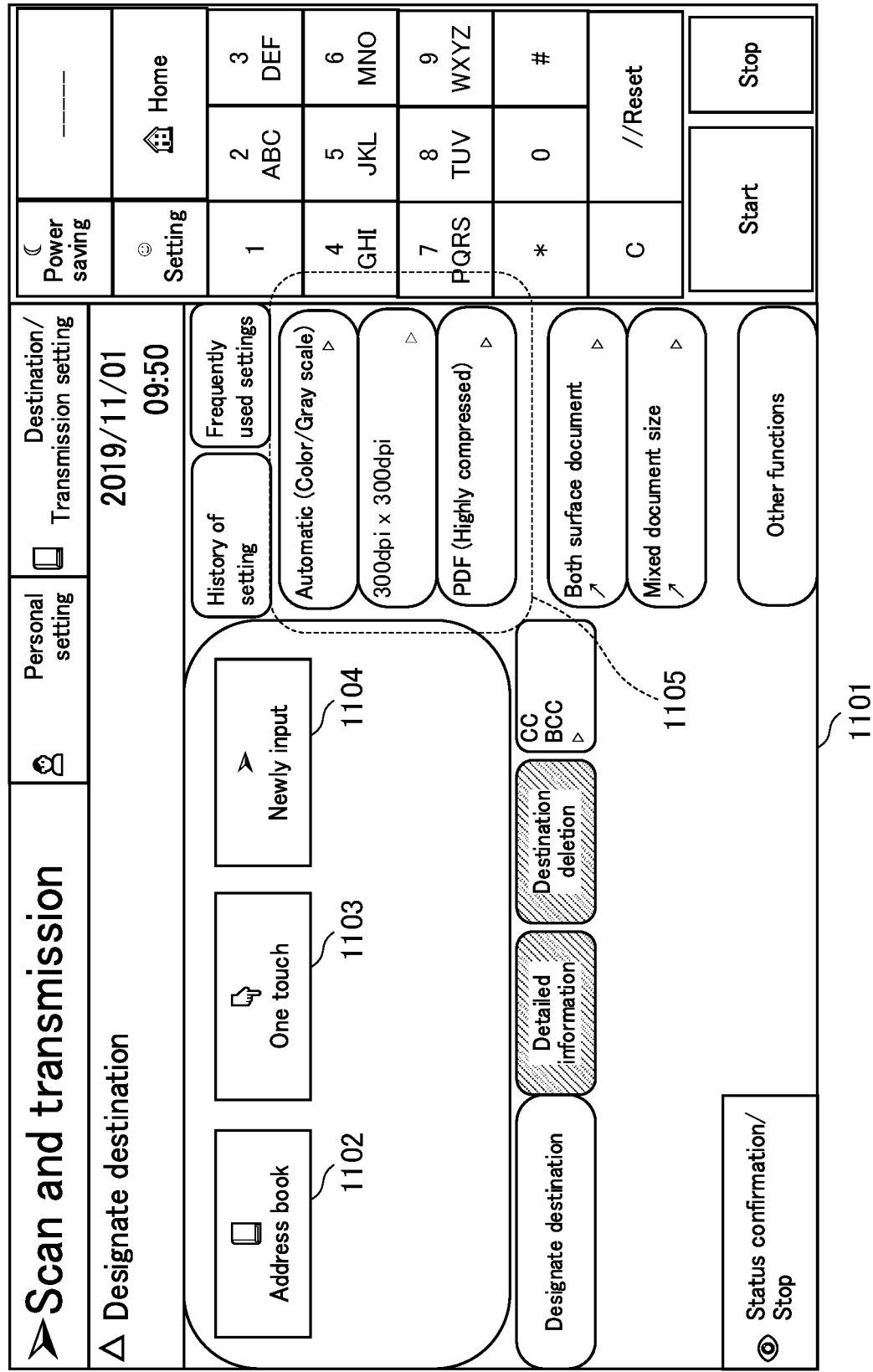
FIG. 12 is a diagram illustrating an example of a transmission function screen displayed in the image processing apparatus.

During the scanning and transmission processing, the image processing apparatus 400 displays a transmission function screen 1101 illustrated in FIG. 12 in the input apparatus 404.

If an address book button 1102 is pressed in the transmission function screen 1101, an address book recorded in the image processing apparatus 400 is displayed. If a one-touch button 1103 is pressed in the transmission function screen 1101, a one-touch destination recorded in the image processing apparatus 400 is displayed. The image processing apparatus 400 receives, from the user, an operation of selecting a destination from these address books and one-touch destination.

If a setting button group 1105 is pressed in the transmission function screen 1101, a screen transitions to a screen (not shown) configured to change settings such as color/monochrome, a resolution, and a file format of an electronic file generated through scanning. The description of these setting changes will be omitted.

Figure 13:
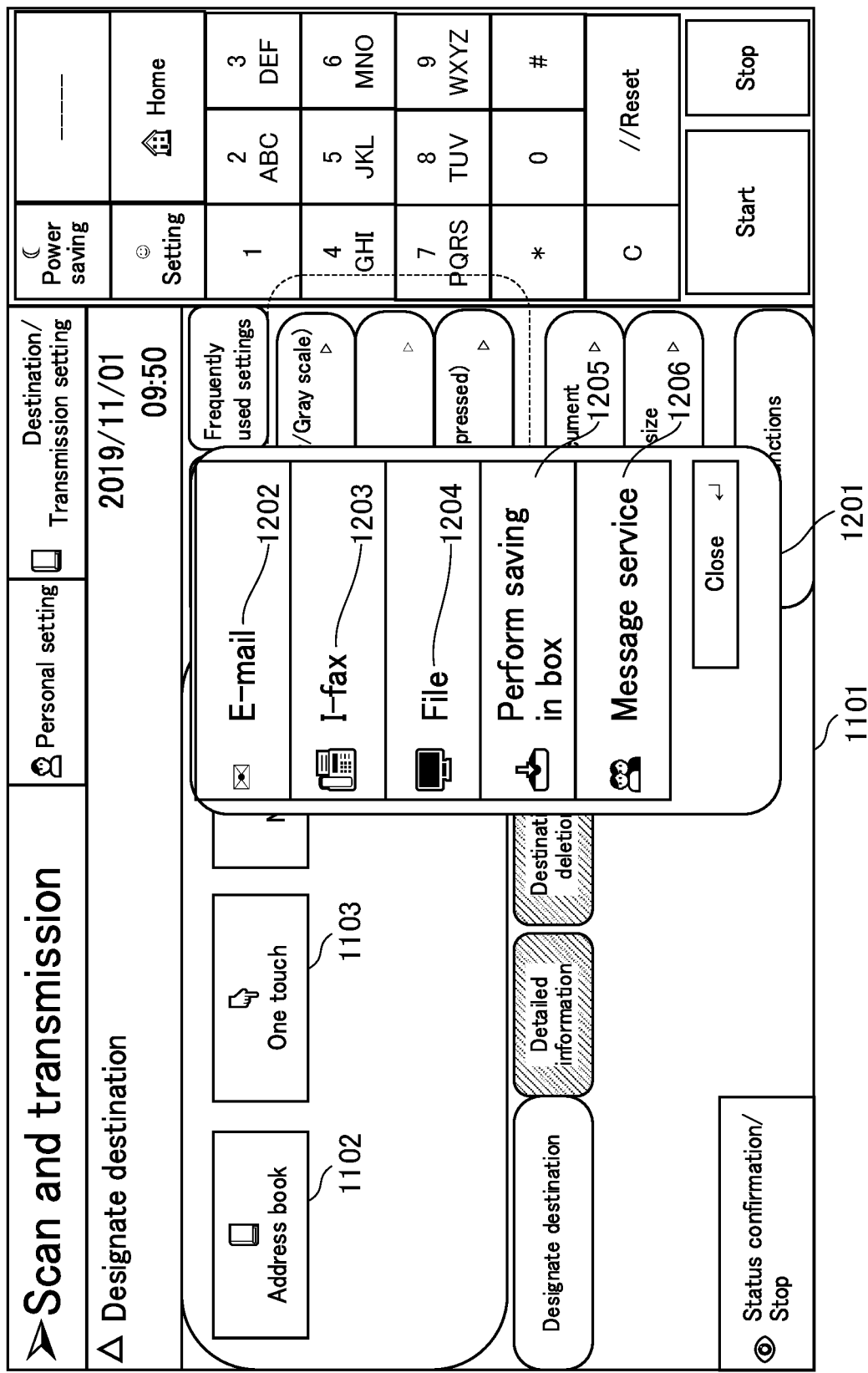
FIG. 13 is a diagram illustrating an example of a destination type selection screen displayed in the image processing apparatus.

On the other hand, if a new destination input button 1104 to a message service is pressed in the transmission function screen 1101, the image processing apparatus 400 displays a destination type selection screen 1201 illustrated in FIG. 13 in the input apparatus 404 (S1001).

The destination type selection screen 1201 receives an operation of selecting a newly input destination type from the user. The destination type selection screen 1201 includes an E-mail destination button 1202, an I-fax button 1203, a file button 1204, a save-in-box button 1205, and a message service button 1206. If the buttons 1202 to 1205 are pressed, as the destination type, an E-mail, an I-fax, a file sharing protocol such as an SMB/FTP/WebDAV, and the hard disk 403 in the image processing apparatus 400 are selected. A description of an operation when the buttons 1202 to 1205 are operated will be omitted.

When scan data is posted to the message sharing system, an operation of pressing the message service button 1206 is performed in the destination type selection screen 1201. If the message service button 1206 is pressed, the image processing apparatus 400 displays a message service destination input screen 1301 illustrated in FIG. 14 in the input apparatus 404 (S1002).

The message service destination input screen 1301 includes a display of a one-time password input field 1302, a cancel button 1303, an OK button 1304, and a software keyboard 1305. If a character string of a one-time password is input using the software keyboard 1305, the input character string is displayed in the one-time password input field 1302. Here, since the one-time password needs to be kept secret, a character string is displayed masked with * (asterisks) in the one-time password input field 1302. Furthermore, if the cancel button 1303 is pressed, the image processing apparatus 400 closes the message service destination input screen 1301 and displays the transmission function screen 1101 in the input apparatus 404.

If the OK button 1304 is pressed after the character string of the one-time password has been input, the image processing apparatus 400 receives the input of the one-time password (S1003).

Thus, the image processing apparatus 400 transmits a search request for a transmission destination name including the input one-time password to the Bot application 301 using the communication apparatus 406 (S1004).

The Bot application 301 searches for a determination concerning whether the one-time password included in the search request is recorded in the file storage 302 upon receiving the search request for the transmission destination name including the one-time password (S1005).

When it is determined that the one-time password for the search request is recorded, the Bot application 301 responds to the image processing apparatus 400 with the transmission destination name associated with the one-time password (S1006). For example, a case in which the user B inputs "1362325623" as a one-time password in the one-time password input field 1302 using the message service destination input screen 1301 may be considered. In this case, a reply of the user B recorded in association with "1362325623" in S507 of FIG. 5 is given as the transmission destination name in S1006.

Figure 15:
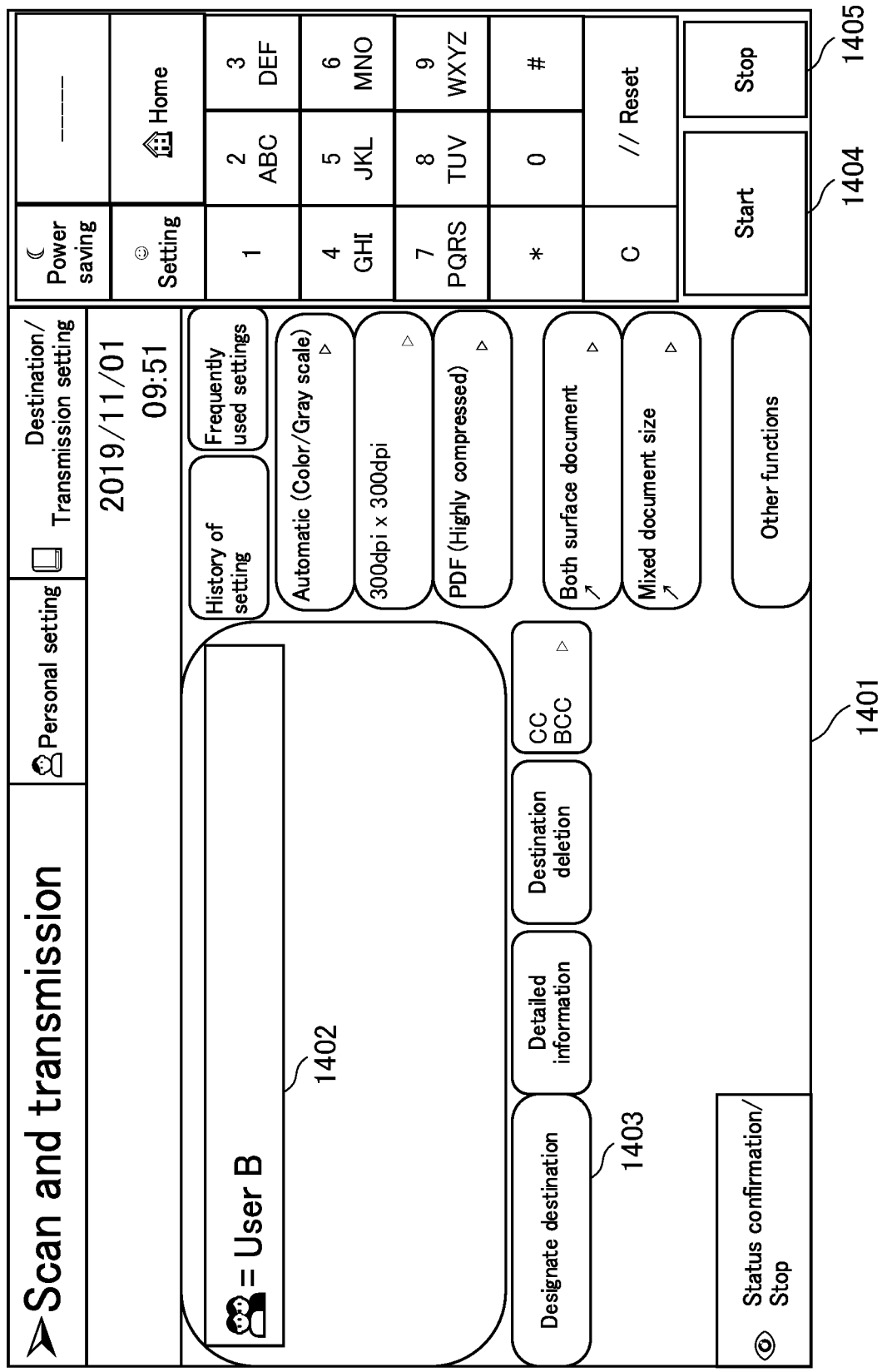
FIG. 15 is a diagram illustrating an example of a transmission destination display screen displayed in the image processing apparatus.

The image processing apparatus 400 displays a transmission destination display screen 1401 illustrated in FIG. 15 in the input apparatus 404 upon receiving the transmission destination name (S1007). The transmission destination name received in S1006 is displayed in a transmission destination display field 1402 of the transmission destination display screen 1401. Furthermore, if a destination designation button 1403 of the transmission destination display screen 1401 is pressed, the transmission function screen 1101 is displayed so that the user can further perform an operation of adding a destination.

If a start button 1404 is pressed in the transmission destination display screen 1401, the image processing apparatus 400 operates the scanner apparatus 407 such that it scans a document on the basis of the contents set in the setting button group 1105 (S1008).

The image processing apparatus 400 generates an electronic file from the scanned data in a format such as PDF or JPEG (S1009). Furthermore, the image processing apparatus 400 transmits the electronic file generated in S1009 and the input one-time password to the Bot application 301 (S1010).

The Bot application 301 searches the file storage 302 upon receiving the electronic file and the one-time password and determines whether a one-time password matching the received one-time password is present in the file storage 302 (S1011). Thus, a transmission destination associated with the one-time password is found.

When the received one-time password is recorded, the Bot application 301 transmits a scan image message transmission request to the message service application 201 (S1012). The scan image message transmission request is provided to transmit a message (a scan image message) including an electronic file generated in S1009 to a transmission destination associated with the one-time password.

Thus, the Bot application 301 performs a process of posting the scan data transmitted from the image processing apparatus 400 to a transmission destination.

The message service application 201 transmits the scan image message to the transmission destination associated with the one-time password upon receiving the scan image message transmission request (S1013).

Figure 16:
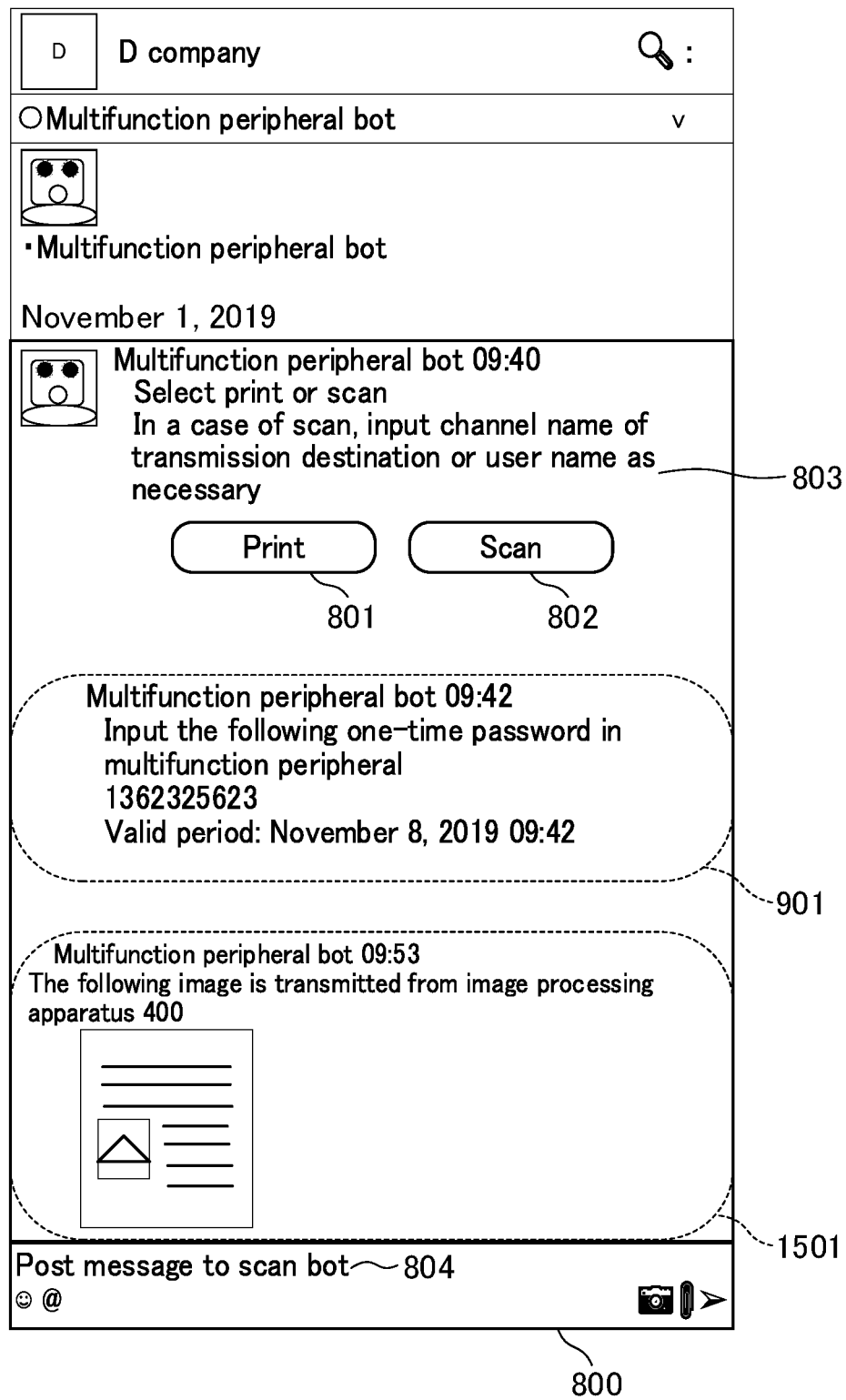
FIG. 16 is a diagram illustrating an example of a scan image message displayed in the message application.
Figure 17:
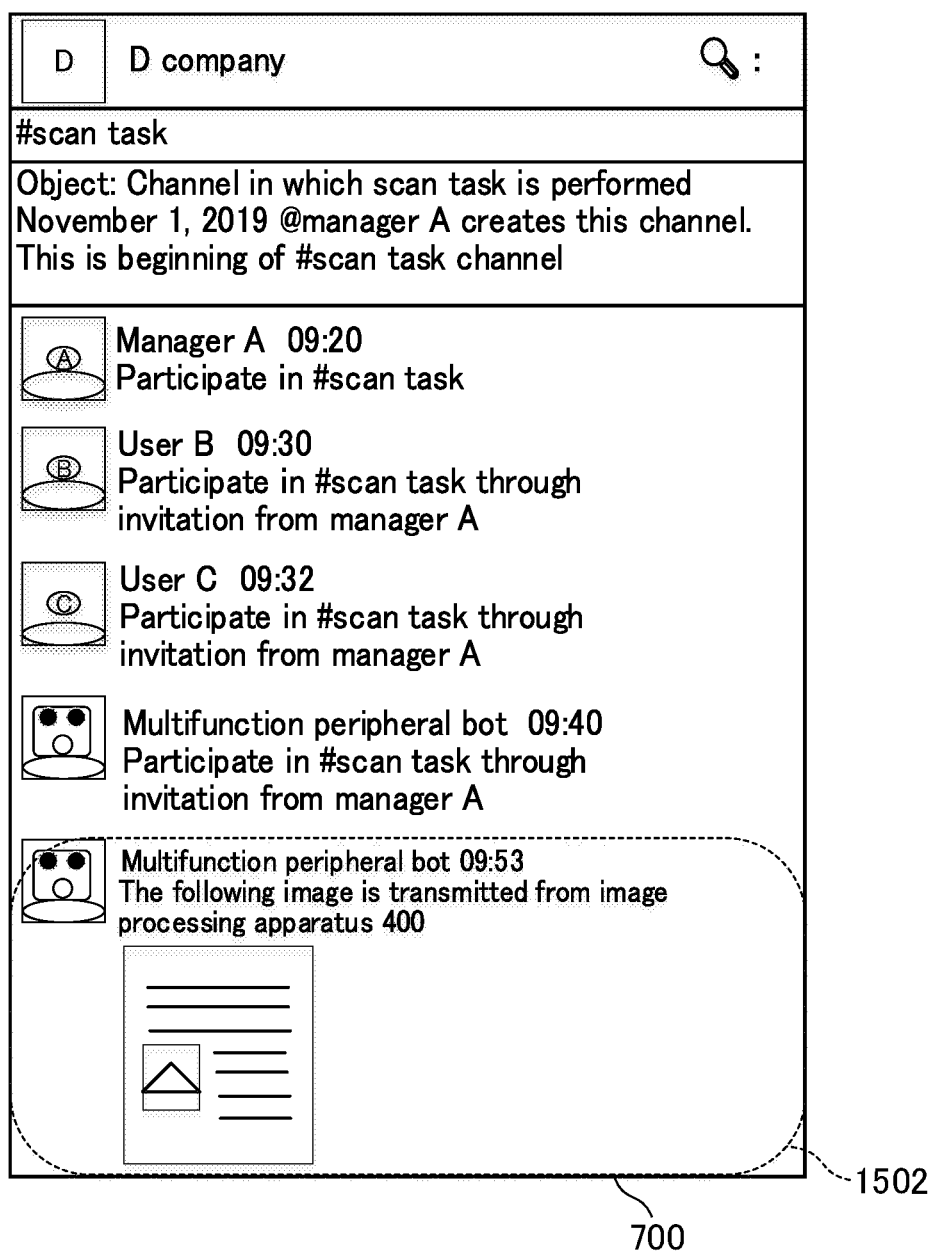
FIG. 17 is a diagram illustrating another example of the scan image message displayed in the message application.

The message application 101 displays the message exchange screen 800 illustrated in FIG. 16 or 17 upon receiving the scan image message.

FIG. 16 is a screen in a case in which a user is a transmission destination without transmitting channel information in S507 of FIG. 5 and includes a display of a scan image message 1501 received from a Bot account. On the other hand, FIG. 17 is a screen in a case in which channel information is transmitted in S507 of FIG. 5 and includes a display of a scan image message 1502 received from a Bot account in a channel.

On the other hand, the Bot application 301 deletes the one-time password (S1014) found in S1010 and the transmission destination associated therewith from the file storage 302 upon transmitting a transmission request for a scan image message (S1012).

Also, the Bot application 301 transmits the transmission result of the message service application 201 in S1012 to the image processing apparatus 400 (S1015).

Figure 18:
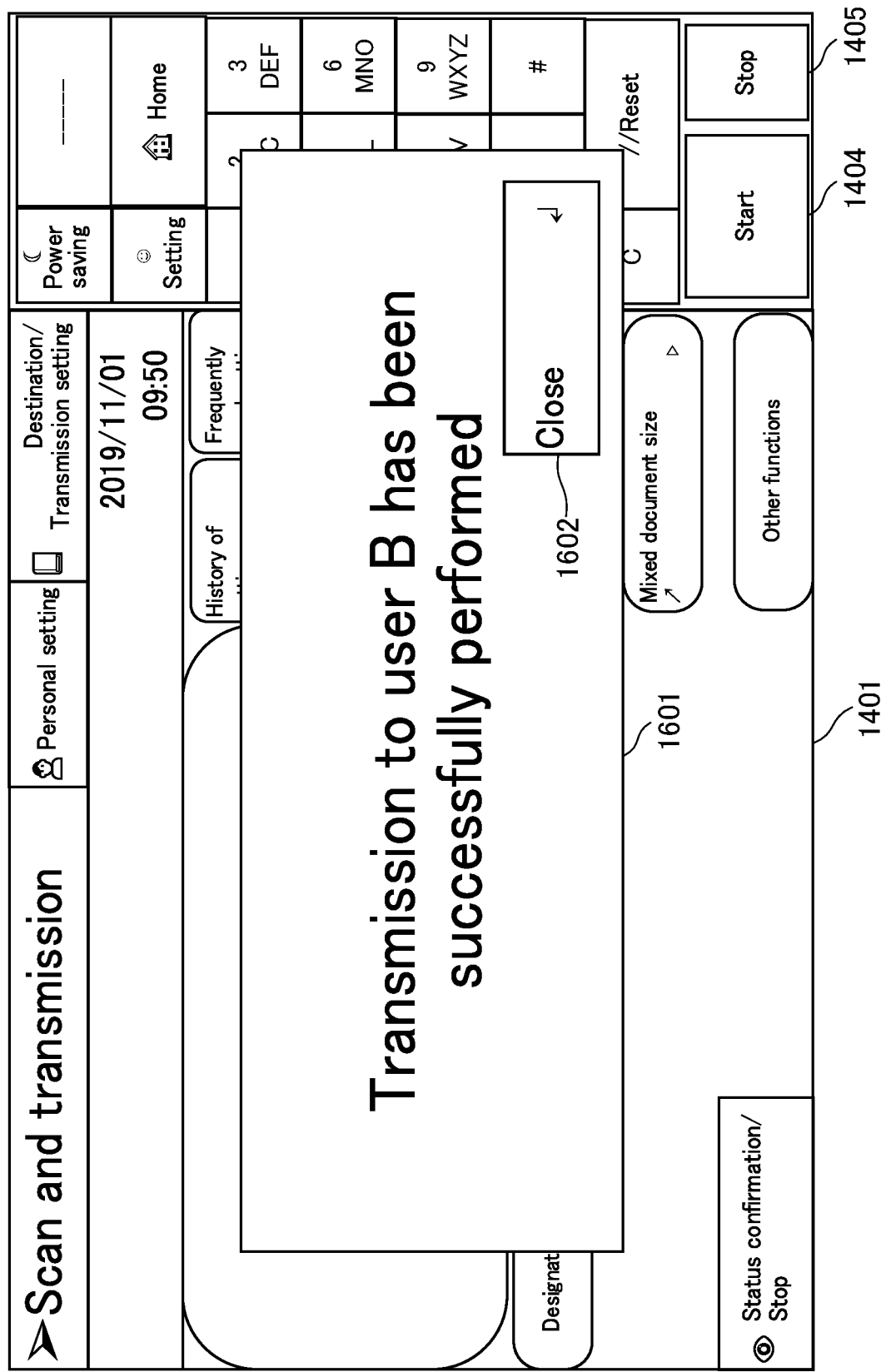
FIG. 18 is a diagram illustrating an example of a display when transmission is successful displayed in the image processing apparatus.

The image processing apparatus 400 displays a result notification pop-up display 1601 illustrated in FIG. 18 in the input apparatus 404 upon receiving the transmission result of S1015 (S1016). The pop-up display 1601 of FIG. 18 is displayed superimposed on the transmission destination display screen 1401. If a close button 1602 is pressed, a display thereof is canceled.

Here, the description associated with FIGS. 10 and 11 is terminated.

In the first embodiment, the Bot application 301 provides the one-time password associated with the scan data destination through the message sharing system to the post source of the scan-related message (S507 to S509). The image processing apparatus 400 transmits the input one-time password and scan data to the Bot application 301 (S1010). The Bot application 301 designates the destination associated with the one-time password when the one-time password transmitted from the image processing apparatus 400 is held and posts the scan data to the message sharing system (S1011 to S1013). Thus, it is possible to perform scanning through the message application of the message sharing system.

Second Embodiment

In a second embodiment, a configuration in which an upper limit is set on the number of one-time passwords issued will be described.

An apparatus configuration and various display screens of the description of the second embodiment that are the same as those of the first embodiment will be denoted by the same reference numerals and all duplicate descriptions thereof will be omitted.

The capacity of a file storage 302 configured to store a Bot application 301 associated with a one-time password and a transmission destination also has an upper limit. For this reason, in the second embodiment, when the one-time password stored in the file storage 302 exceeds a certain number, the Bot application 301 returns an error upon receiving a scan request notification (S505) until the number falls below a certain number.

Figure 19:
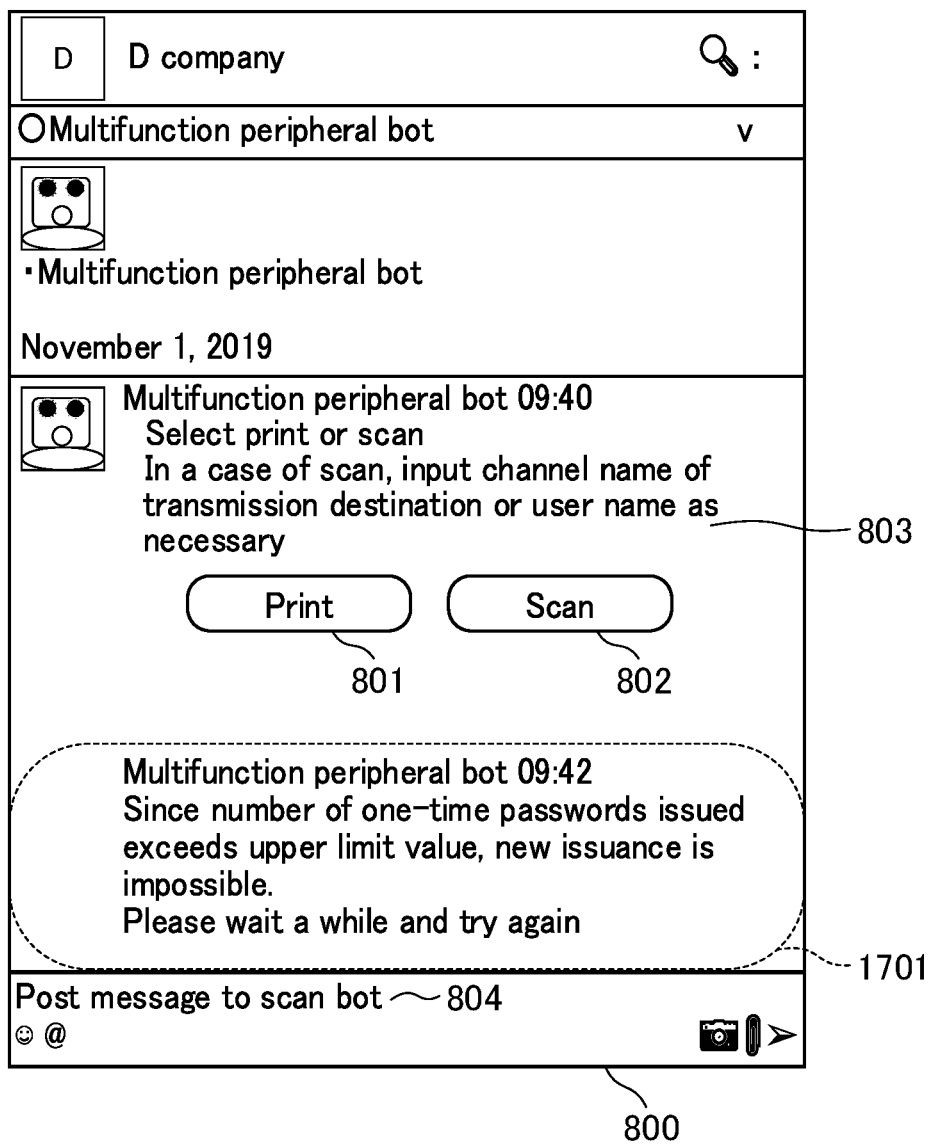
FIG. 19 is a diagram illustrating an example of an error screen in a second embodiment.

In the second embodiment, when the above error is returned, as illustrated in FIG. 19, an error message 1701 is displayed on a message exchange screen 800 of a message application 101. The error message 1701 includes a message indicating that the number of one-time passwords issued exceeds an upper limit value. The upper limit of the number of one-time passwords issued may be set for the total number of all users or may be set individually for each requesting user.

Also, other cases in which an error occurs in the process of the second embodiment include the following cases. A first case is a case in which a one-time password is not recorded in the file storage 302 as a result of the search of S1005 of FIG. 10 or S1011 of FIG. 11. A second case is a case in which a one-time password has passed an expiration date of the one-time password found in the search.

Figure 20:
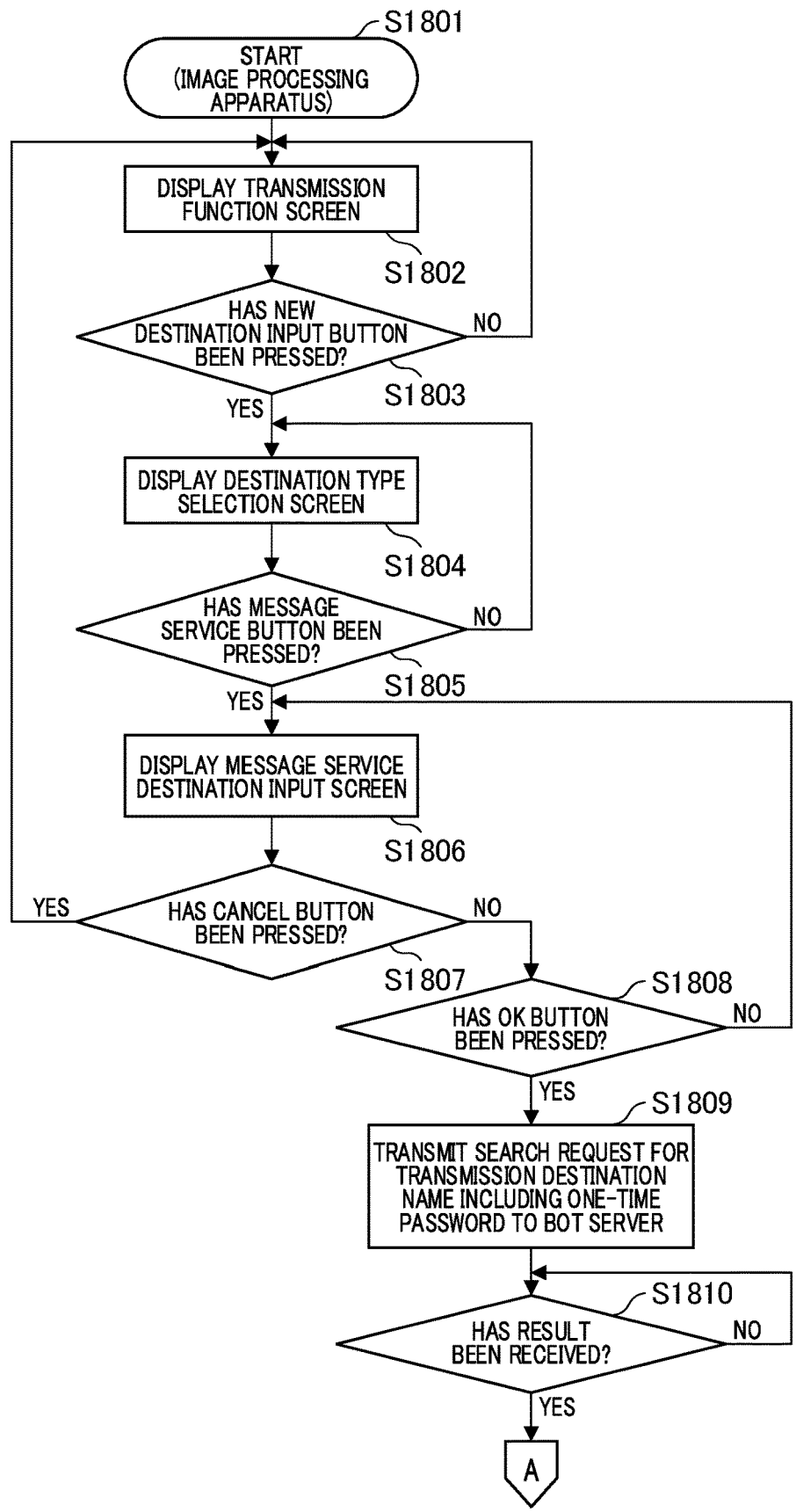
FIG. 20 is a flowchart for describing processing of an image processing apparatus in the second embodiment.
Figure 21:
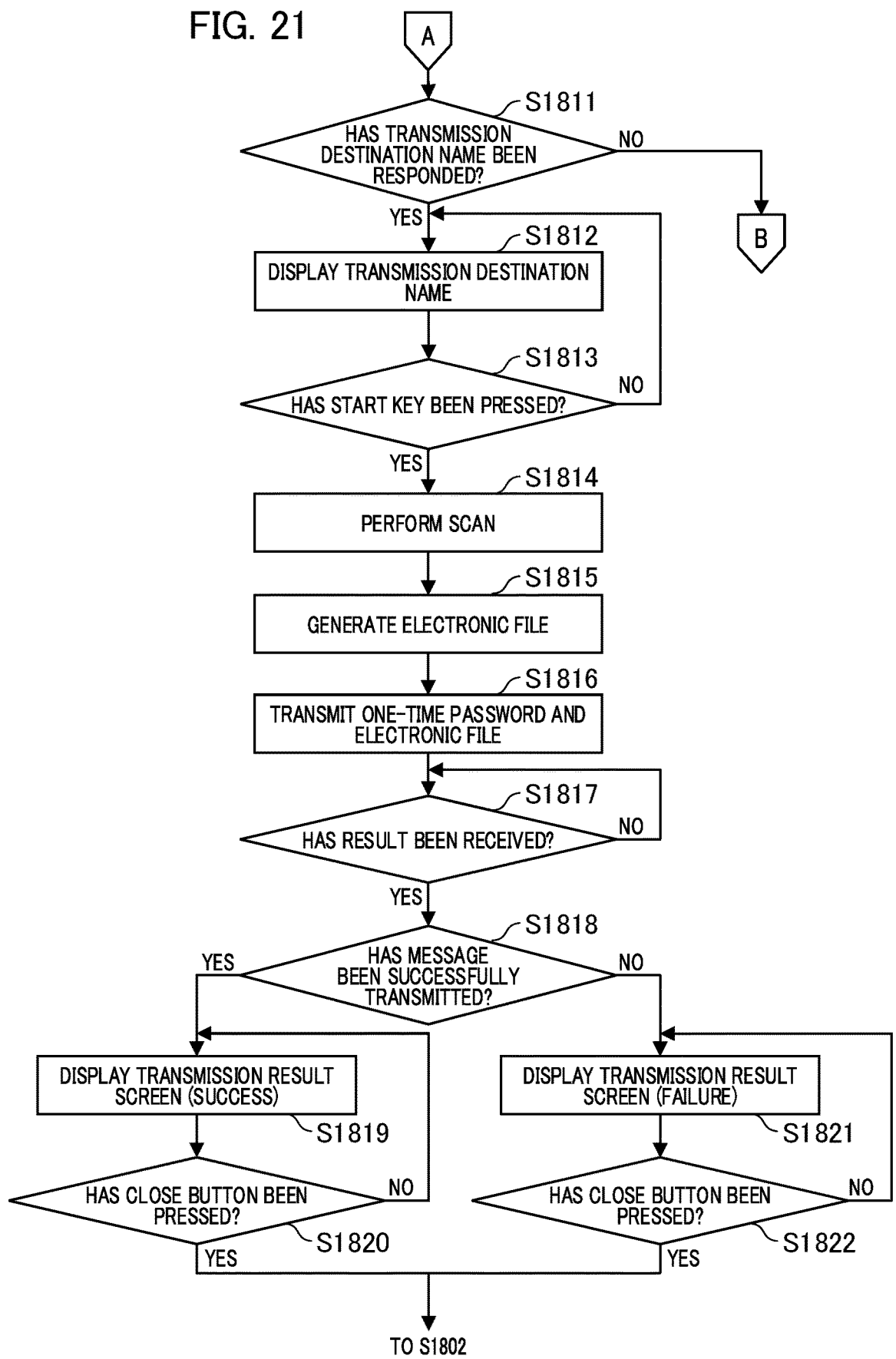
FIG. 21 is a diagram that is a continuation of FIG. 20.
Figure 22:
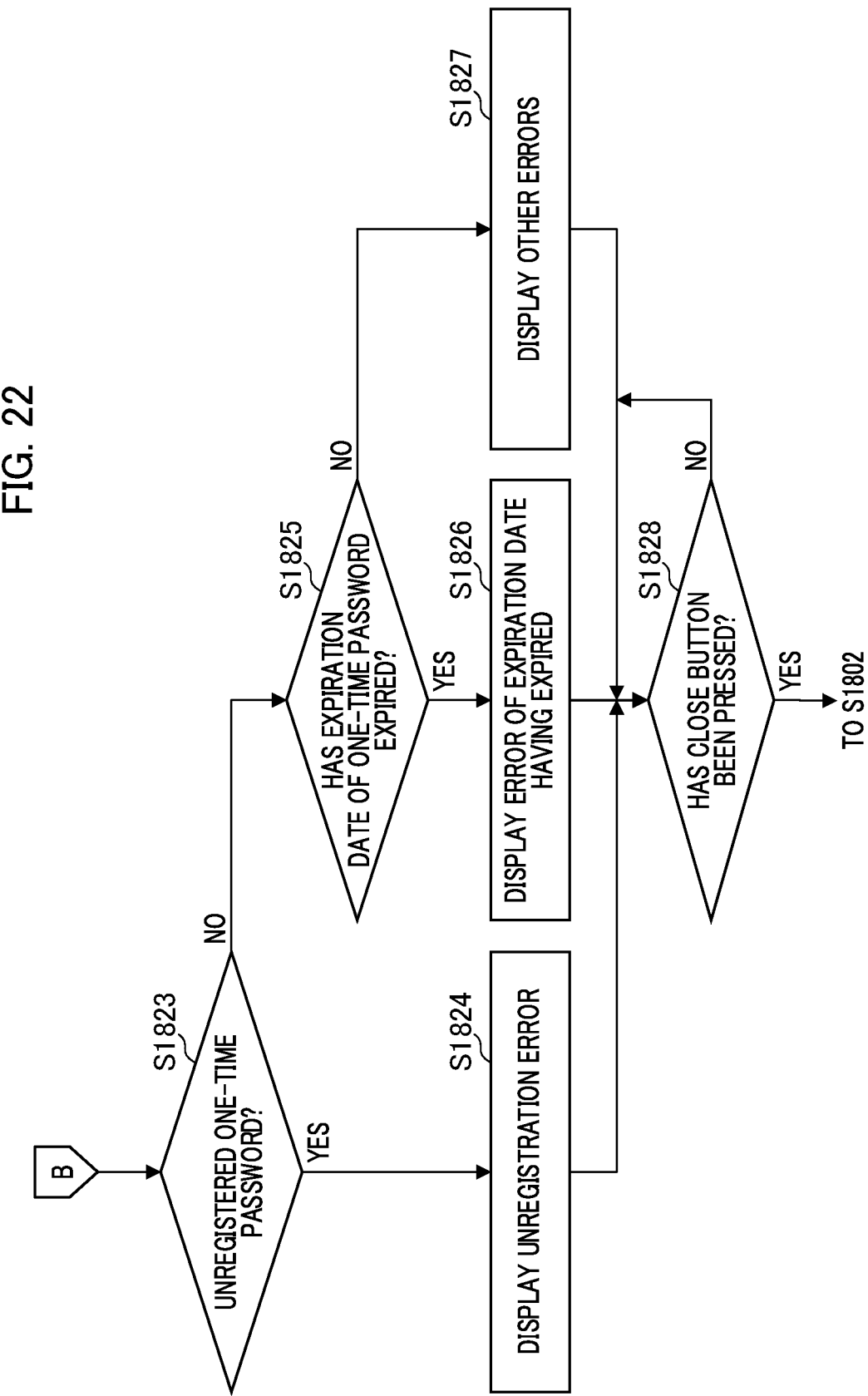
FIG. 22 is a diagram that is a continuation of FIG. 21.

An example of processes of an image processing apparatus 400 in the second embodiment will be described below with reference to FIGS. 20 to 22. Each of the processes of FIGS. 20 to 22 is realized, for example, when a CPU 401 of the image processing apparatus 400 loads a program into a RAM 402 and executes the program.

In S1801, the image processing apparatus 400 starts processing in response to, for example, turning-on of a power supply.

In S1802, the image processing apparatus 400 displays a transmission function screen 1101 illustrated in FIG. 12 in an input apparatus 404.

In S1803, the image processing apparatus 400 determines whether a new destination input button 1104 has been pressed on the transmission function screen 1101. When it is determined that the new destination input button has been pressed, the process proceeds to the process of S1804. On the other hand, when it is determined that the new destination input button has not been pressed, the process returns to the process of S1802.

In S1804, the image processing apparatus 400 displays a destination type selection screen 1201 illustrated in FIG. 13 in the input apparatus 404.

In S1805, the image processing apparatus 400 determines whether a message service button 1206 has been pressed on the destination type selection screen 1201. When it is determined that the message service button has been pressed, the process proceeds to the process of S1806. On the other hand, when it is determined that the message service button has not been pressed, the process returns to the process of S1804.

Figure 14:
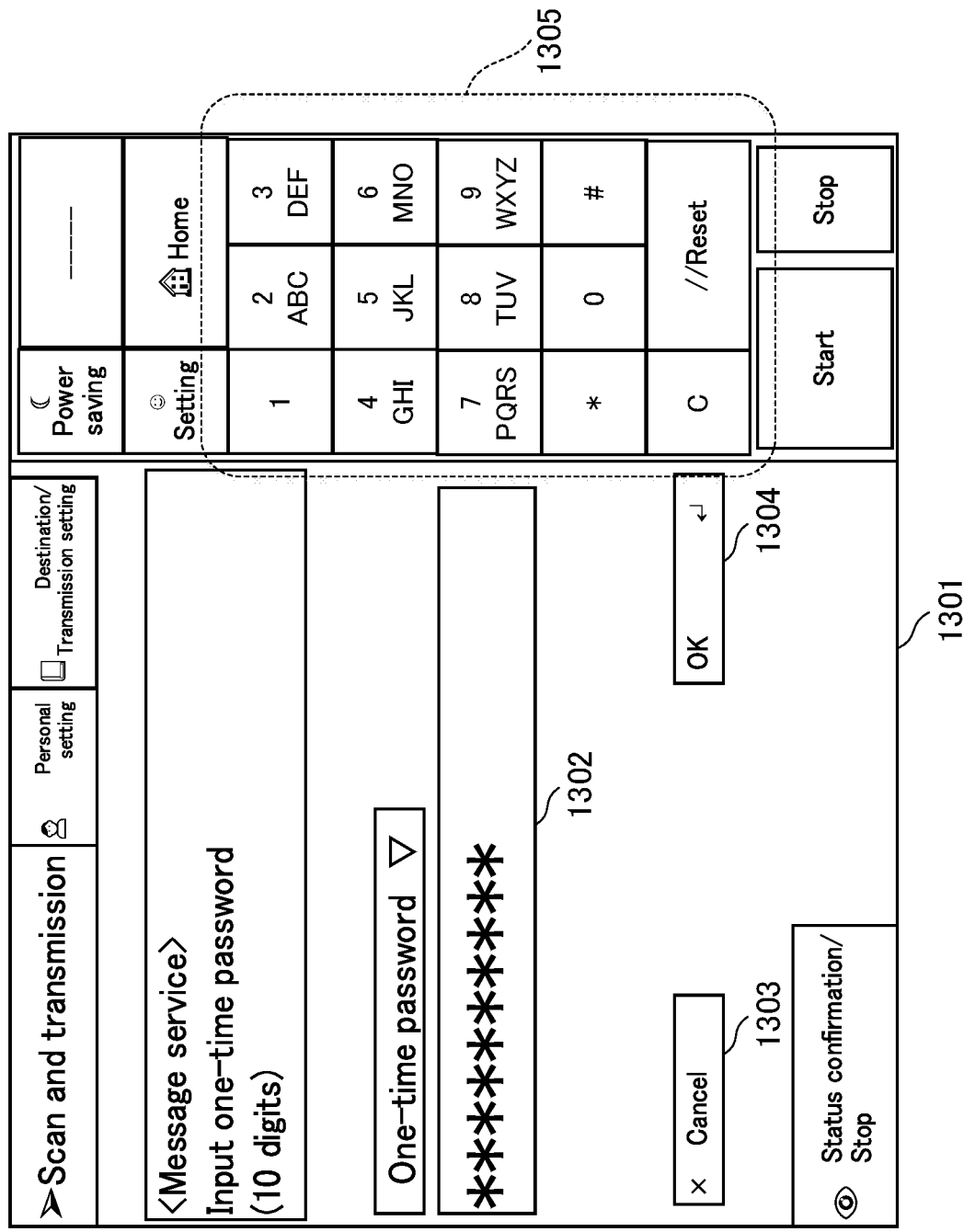
FIG. 14 is a diagram illustrating an example of a message service destination input screen displayed in the image processing apparatus.

In S1806, the image processing apparatus 400 displays a message service destination input screen 1301 illustrated in FIG. 14 in the input apparatus 404.

In S1807, the image processing apparatus 400 determines whether a cancel button 1303 has been pressed on the message service destination input screen 1301. When it is determined that the cancel button has been pressed, the process returns to the process of S1802. On the other hand, when it is determined that the cancel button has not been pressed, the process proceeds to the process of S1808.

In S1808, the image processing apparatus 400 determines whether an OK button 1304 has been pressed on the message service destination input screen 1301. When it is determined that the OK button has been pressed, the process proceeds to the process of S1809. On the other hand, when it is determined that the OK button has not been pressed, the process returns to the process of S1806.

In S1809, the image processing apparatus 400 transmits a search request for a transmission destination name including a one-time password to the Bot application 301.

In S1810, the image processing apparatus 400 determines whether a response has been received from the Bot application 301. When it is determined that the response has been received, the process proceeds to the process of S1811. On the other hand, when it is determined that the response has not been received, the image processing apparatus 400 waits for a response from the Bot application 301.

In S1811, the image processing apparatus 400 determines whether a transmission destination name has been responded from the Bot application 301. When it is determined that the transmission destination name has been responded, the process proceeds to the process of S1812. On the other hand, when it is determined that the transmission destination name has not been responded, the process proceeds to the process of S1823.

In S1812, the image processing apparatus 400 displays a transmission destination display screen 1401 illustrated in FIG. 15 in the input apparatus 404 and displays the received transmission destination name in a transmission destination display field 1402.

In S1813, the image processing apparatus 400 determines whether a start button 1404 has been pressed on the transmission destination display screen 1401. When it is determined that the start button has been pressed, the process proceeds to the process of S1814. On the other hand, when it is determined that the start button has not been pressed, the process returns to the process of S1812.

In S1814, the image processing apparatus 400 operates a scanner apparatus 407 to scan a document.

In S1815, the image processing apparatus 400 generates an electronic file from the scanned data in a format such as PDF or JPEG.

In S1816, the image processing apparatus 400 transmits the electronic file generated in S1815 and the one-time password input on the message service destination input screen 1301 to the Bot application 301.

In S1817, the image processing apparatus 400 determines whether a response of the transmission result has been received from the Bot application 301. When it is determined that the response of the transmission result has been received, the process proceeds to the process of S1818. On the other hand, when it is determined that the response of the transmission result has not been received, the image processing apparatus 400 waits for the response of the transmission result from the Bot application 301.

In S1818, the image processing apparatus 400 determines whether a scan image message has been successfully transmitted to a transmission destination. When it is determined that the transmission is successful, the process proceeds to the process of S1819. On the other hand, when it is determined that the transmission fails, the process proceeds to the process of S1821.

In S1819, as illustrated in FIG. 18, the image processing apparatus 400 displays a pop-up display 1601 configured to provide a notification concerning the success of transmission to the transmission destination on the transmission destination display screen 1401 of the input apparatus 404.

In S1820, the image processing apparatus 400 determines whether a close button 1602 in the pop-up display 1601 has been pressed. When it is determined that the close button has been pressed, the image processing apparatus 400 closes the pop-up display 1601 and the process returns to the process of S1802. On the other hand, when it is determined that the close button has not been pressed, the process returns to the process of S1819.

Figure 25:
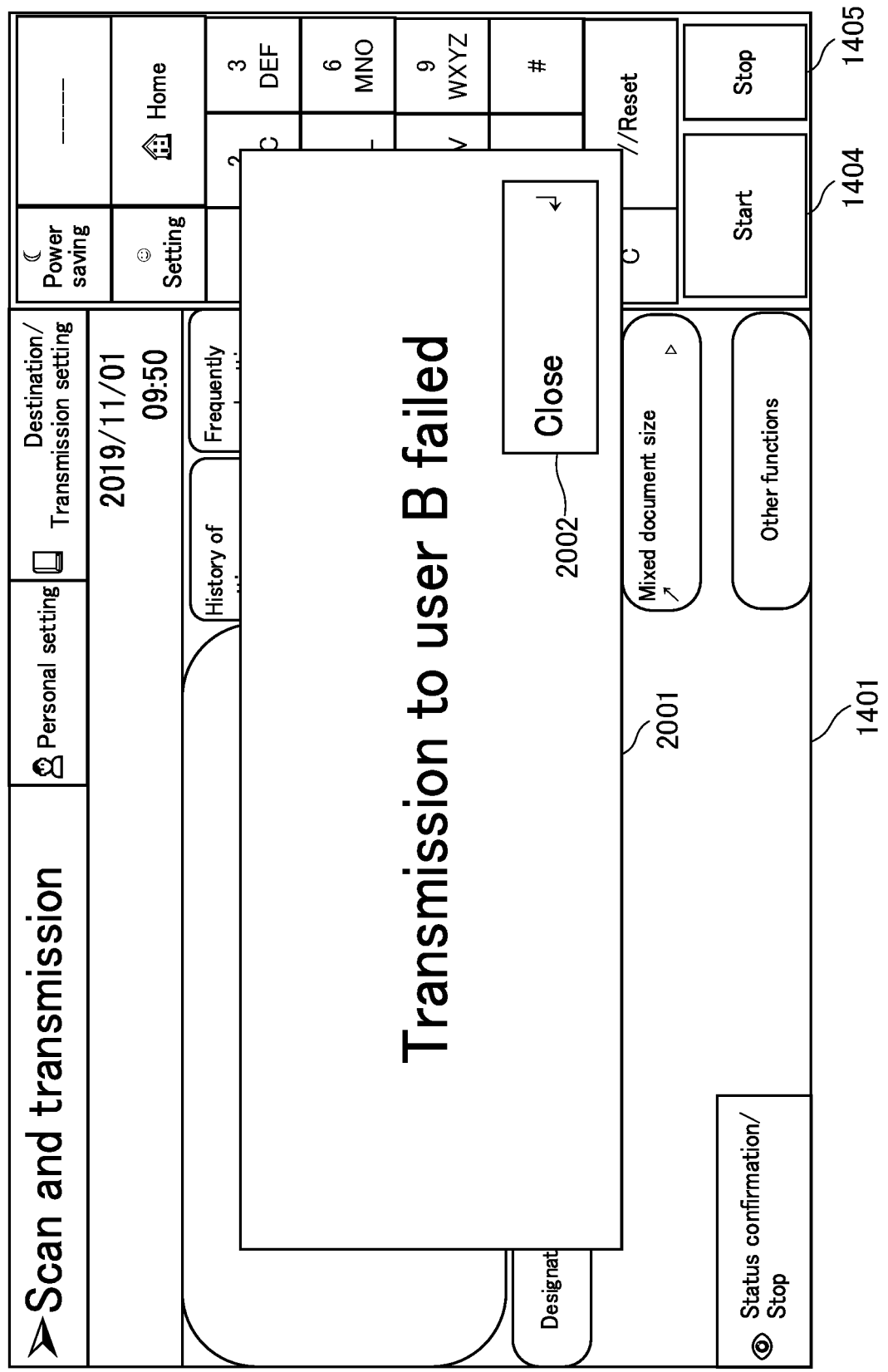
FIG. 25 is a diagram illustrating an example of a display when transmission fails displayed in an image processing apparatus.

In S1821, as illustrated in FIG. 25, the image processing apparatus 400 displays a pop-up display 2001 configured to provide a notification concerning a transmission failure to the transmission destination on the transmission destination display screen 1401 of the input apparatus 404.

In S1822, the image processing apparatus 400 determines whether a close button 2002 in the pop-up display 2001 has been pressed. When it is determined that the close button has been pressed, the image processing apparatus 400 closes the pop-up display 2001 and the process returns to the process of S1802. On the other hand, when it is determined that the close button has not been pressed, the process returns to the process of S1821.

In S1823, the image processing apparatus 400 confirms the response from the Bot application 301 and determines whether the transmitted one-time password has not been registered. When it is determined that the one-time password has not been registered, the process proceeds to the process of S1824. On the other hand, when it is determined that the one-time password has been registered, the process proceeds to the process of S1825.

Figure 26:
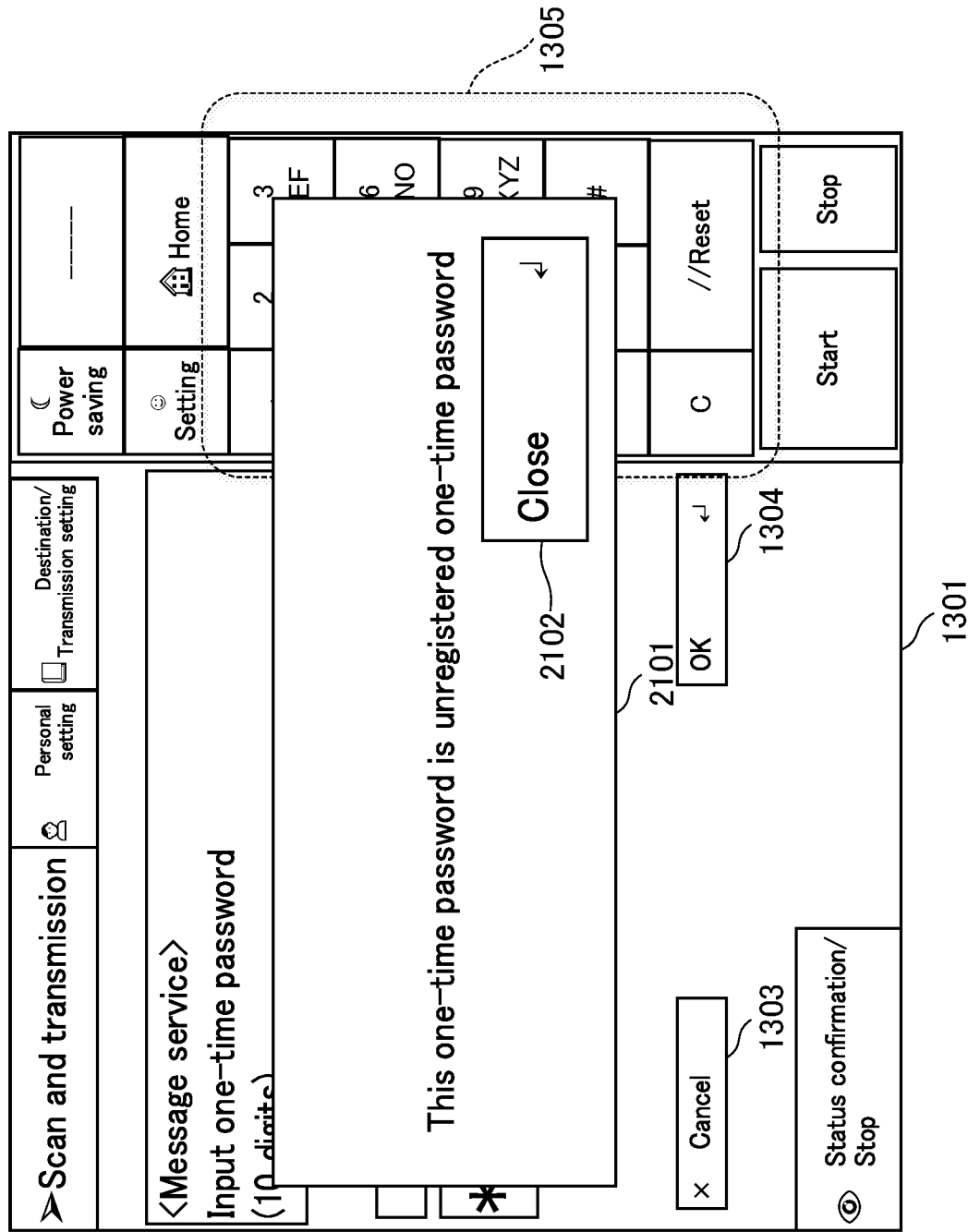
FIG. 26 is a diagram illustrating an example of an error display when a one-time password is not registered.

In S1824, as illustrated in FIG. 26, the image processing apparatus 400 displays an error display 2101 configured to notify that the one-time password has not been registered on the message service destination input screen 1301 of the input apparatus 404. After that, the process proceeds to the process of S1828.

In S1825, the image processing apparatus 400 confirms the response from the Bot application 301 and determines whether an expiration date of the transmitted one-time password has expired. When it is determined that the expiration date of the one-time password has expired, the process proceeds to the process of S1826. On the other hand, when it is determined that the expiration date of the one-time password has not expired, the process proceeds to the process of S1827.

In S1826, as illustrated in FIG. 27, the image processing apparatus 400 displays an error display 2201 configured to notify that the expiration date of the one-time password has expired on the message service destination input screen 1301 of the input apparatus 404. After that, the process proceeds to the process of S1828.

In S1827, the image processing apparatus 400 displays an error display (not shown) indicating that an error is another error (a reason other than the one-time password having not been registered or the expiration date having expired) on the message service destination input screen 1301 of the input apparatus 404. After that, the process proceeds to the process of S1828.

In S1828, the image processing apparatus 400 determines whether a close button (reference numeral 2102 of FIG. 26 or reference numeral 2202 of FIG. 27) in the error display has been pressed. When it is determined that the close button has been pressed, the image processing apparatus 400 closes the error display and the process returns to the process of S1802. On the other hand, when it is determined that the close button has not been pressed, the image processing apparatus 400 waits for the close button to be pressed.

Here, the description associated with FIGS. 20 to 22 is terminated.

Figure 23:
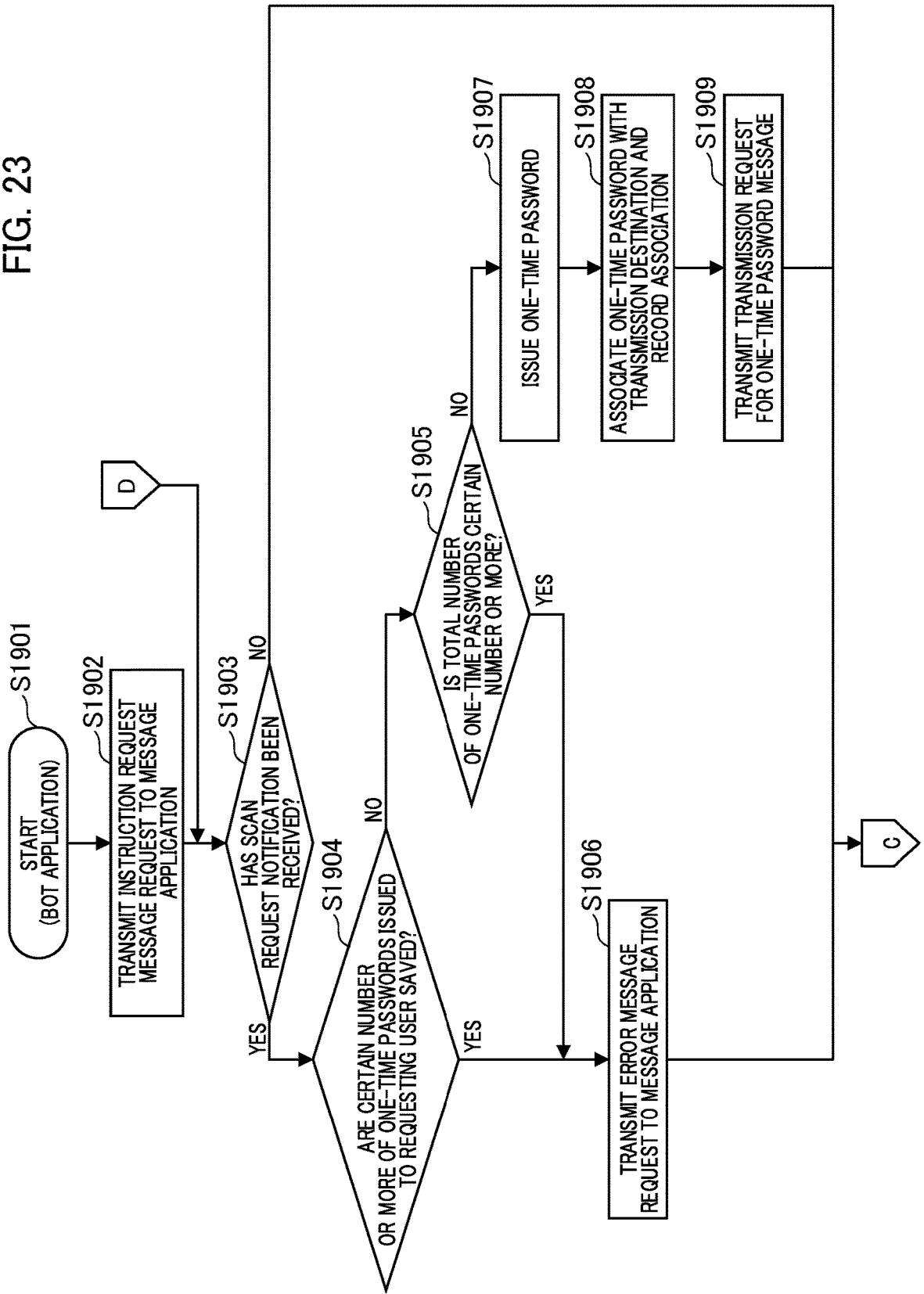
FIG. 23 is a flowchart for describing an example of processing of a Bot application in the second embodiment.
Figure 24A:
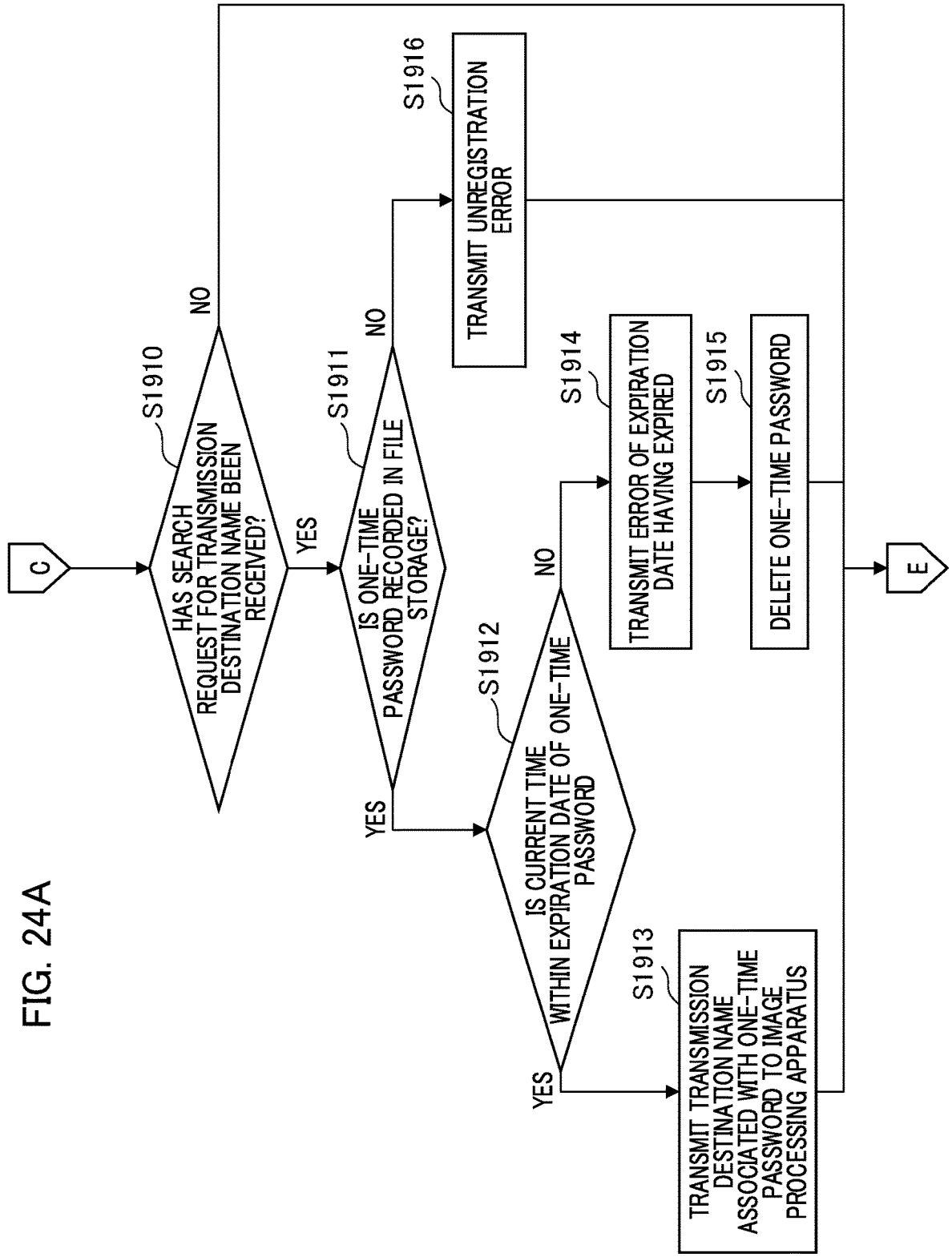
FIG. 24A and FIG. 24B are diagrams that are continuation of FIG. 23.
Figure 24B:
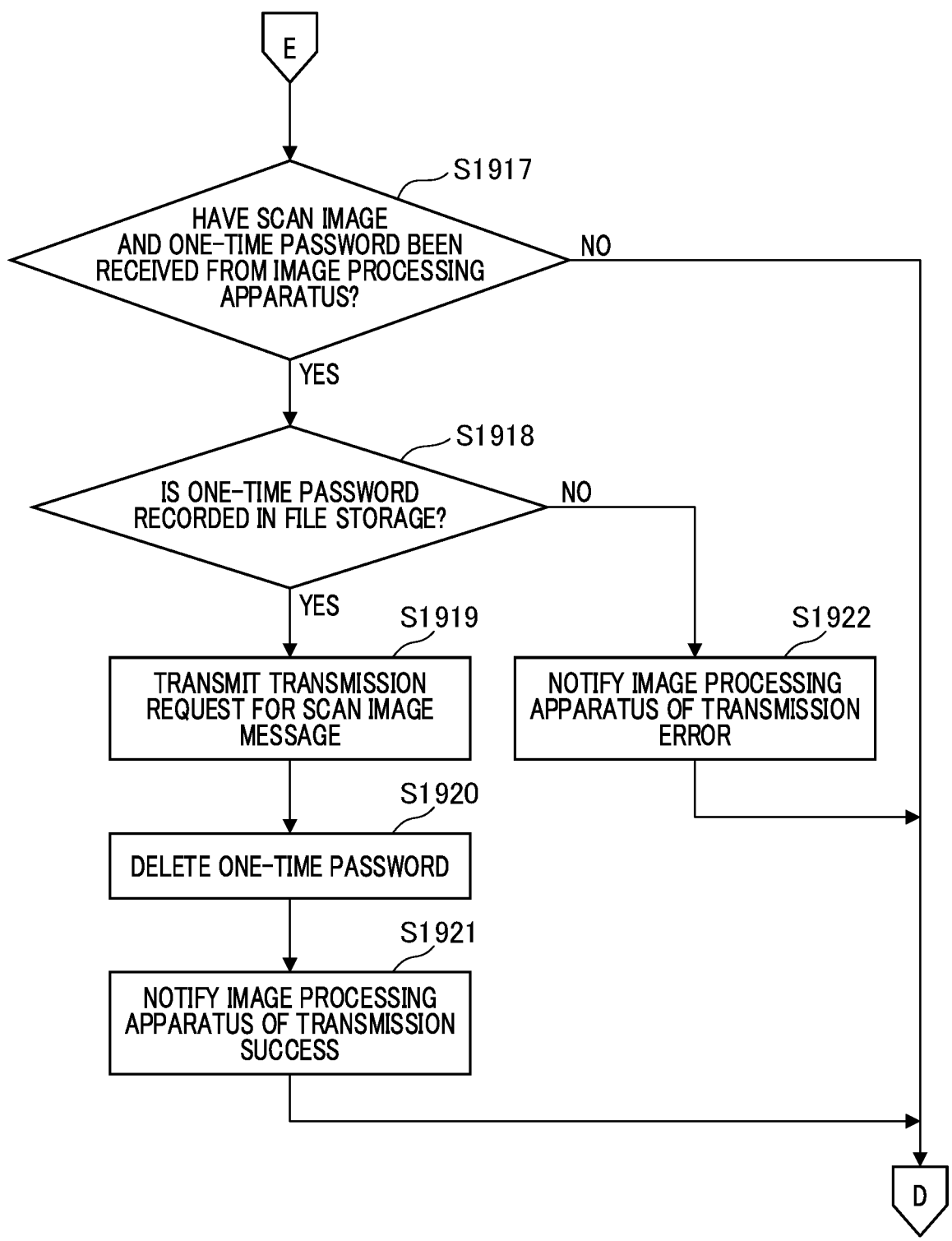

An example of the process of the Bot application 301 in the second embodiment will be described below with reference to FIGS. 23, 24A and 24B. Each of the processes of FIGS. 23, 24A and 24B is realized, for example, when a CPU of a Bot application server 300 loads a program of the Bot application 301 into a RAM and executes the program.

In S1901, for example, the process is started in accordance with the starting-up of the Bot application 301.

In S1902, the Bot application 301 transmits a request for an instruction request message to the message service application 201.

In S1903, the Bot application 301 determines whether the scan request notification has been received from the message service application 201. When it is determined that the scan request notification has been received, the process proceeds to the process of S1904. On the other hand, when it is determined that the scan request notification has not been received, the process proceeds to the process of S1910.

In S1904, the Bot application 301 searches the file storage 302 and determines whether a certain number or more of the one-time passwords issued to the requesting user are saved. When it is determined that the certain number or more of one-time passwords of the user are saved, the process proceeds to the process of S1906. On the other hand, when it is determined that the certain number or more of one-time passwords of the user are not saved, the process proceeds to the process of S1905.

In S1905, the Bot application 301 searches the file storage 302 and determines whether the total number of saved one-time passwords is a certain number or more. Threshold values (a certain number) of S1904 and S1905 can be different values. When it is determined that the total number of one-time passwords is the certain number or more, the process proceeds to the process of S1906. On the other hand, when it is determined that the total number of one-time passwords is less than the certain number, the process proceeds to the process of S1907.

In S1906, the Bot application 301 transmits an error message request to the message service application 201. The message service application 201 which has received the error message request transmits an error message (not shown) indicating that the one-time password cannot be issued to the client terminal 100. After that, the process proceeds to the process of S1910.

In S1907, the Bot application 301 issues a one-time password in which the request can uniquely be identified and an expiration date has been set.

In S1908, the Bot application 301 associates the transmission destination of the one-time password with the one-time password issued in S1907 and records the association in the file storage 302.

In S1909, the Bot application 301 transmits a one-time password message transmission request to the message service application 201.

In S1910, the Bot application 301 determines whether a search request for a transmission destination name has been received from the image processing apparatus 400. When it is determined that the search request for the transmission destination name has been received, the process proceeds to the process of S1911. On the other hand, when it is determined that the search request for the transmission destination name has not be received, the process proceeds to the process of S1917.

In S1911, the Bot application 301 searches the file storage 302 upon receiving the search request for the transmission destination name. Furthermore, the Bot application 301 determines whether the one-time password included in the search request is recorded in the file storage 302. When it is determined that the one-time password is recorded in the file storage 302, the process proceeds to the process of S1912. On the other hand, when it is determined that the one-time password is not recorded in the file storage 302, the process proceeds to the process of S1916.

In S1912, the Bot application 301 determines whether a current time is within an expiration date of the one-time password. When it is determined that the current time is within the expiration date, the process proceeds to the process of S1913. On the other hand, when the current time is later than the expiration date (the expiration date having expired), the process proceeds to the process of S1914.

In S1913, the Bot application 301 responds to the image processing apparatus with the transmission destination name associated with the one-time password. Then, the process proceeds to the process of S1917.

In S1914, the Bot application 301 transmits an error notification indicating that the expiration date of the one-time password has expired to the image processing apparatus 400.

In S1915, the Bot application 301 deletes the one-time password and the information concerning the associated transmission destination from the file storage 302. After that, the process proceeds to the process of S1917.

In S1916, the Bot application 301 transmits an error notification indicating that the one-time password has not been registered to the image processing apparatus 400. After that, the process proceeds to the process of S1917.

In S1917, the Bot application 301 determines whether the electronic file of the scan image and the one-time password have been received from the image processing apparatus 400. When it is determined that the scan image and the one-time password have been received, the process proceeds to the process of S1918. On the other hand, when it is determined that the scan image and the one-time password have not been received, the process returns to the process of S1903.

In S1918, the Bot application 301 determines whether the one-time password received in S1917 is recorded in the file storage 302. When it is determined that the one-time password is recorded in the file storage 302, the process proceeds to the process of S1919. On the other hand, when it is determined that the one-time password is not recorded in the file storage 302, the process proceeds to the process of S1922.

In S1919, the Bot application 301 transmits the scan image message transmission request to the message service application 201.

In S1920, the Bot application 301 deletes the one-time password and the information concerning the associated transmission destination from the file storage 302.

In S1921, the Bot application 301 transmits a notification indicating successful transmission as a transmission result to the image processing apparatus 400. After that, the process returns to the process of S1903.

In S1922, the Bot application 301 transmits an error notification indicating a transmission failure as a transmission result to the image processing apparatus 400. After that, the process returns to the process of S1903.

Here, the description associated with FIGS. 23, 24A and 24B is terminated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory apparatus, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-21869, filed Feb. 12, 2020 which is hereby incorporated by reference wherein in its entirety.

What is claimed is:

1. A scan system which includes a computer configured to execute a web application linked with a message sharing system and an image processing apparatus including a scanner,
wherein the computer comprises:
a first memory storing first instructions; and
a first processor executing the first instructions causing the computer to:
issue confirmation data in response to a scan request generated on the basis of a post of a scan-related message from a user account belonging to the message sharing system;
receive, as a destination to which scan data is posted, a designation of a communication space in the message sharing system or a direct message to the user account belonging to the message sharing system;
store the destination associated with the confirmation data in a storage; and
provide the confirmation data to a post source of the scan-related message through the message sharing system,
wherein the image processing apparatus comprises:
a second memory storing second instructions; and
a second processor executing the second instructions causing the image processing apparatus to:
receive an input of data from a user for a scan service using the message sharing system; and
transmit the input data and scan data generated using the scanner to the computer so that the scan data is the post to the destination through the message sharing system, and
wherein the first instructions further cause the computer to:
when the input data transmitted from the image processing apparatus corresponds to the confirmation data stored in the storage, post the scan data transmitted from the image processing apparatus to the destination associated with the confirmation data through the message sharing system.

2. The scan system according to claim 1, wherein the first instructions further cause the computer to:
receive the scan request through a Bot account registered in the message sharing system.

3. The scan system according to claim 1, wherein the confirmation data is provided using a Bot account registered in the message sharing system through the message sharing system.

4. The scan system according to claim 1, wherein the scan data is posted through a Bot account registered in the message sharing system.

5. The scan system according to claim 1, wherein an application configured to receive the input data is installed in the image processing apparatus for the scan service using the message sharing system.

6. The scan system according to claim 1, wherein the confirmation data has an expiration date.

7. A method of controlling a scan system which includes a computer configured to execute a web application linked with a message sharing system and an image processing apparatus including a scanner, the method comprising:
issuing, by the web application, confirmation data in response to a scan request generated on the basis of a post of a scan-related message from a user account belonging to the message sharing system;
receiving, by the web application, as a destination to which scan data is posted, a designation of a communication space in the message sharing system or a direct message to the user account belonging to the message sharing system;
storing, by the web application, the destination associated with the confirmation data in a storage;
providing, by the web application, the confirmation data to a post source of the scan-related message through the message sharing system;
receiving, by the image processing apparatus, an input of data from a user for a scan service using the message sharing system;
transmitting, by the image processing apparatus, the input data and scan data generated using the scanner to the computer so that the scan data is the post to the destination through the message sharing system; and
when the input data transmitted from the image processing apparatus corresponds to the confirmation data stored in the storage, posting, by the web application, the scan data transmitted from the image processing apparatus to the destination associated with the confirmation data through the message sharing system.

8. An image processing apparatus comprising:
a scanner;
a memory storing instructions; and
a processor executing instructions causing the image processing apparatus to:
receive an input of data from a user for a scan service using a message sharing system; and
transmit the input data and scan data generated using the scanner to a web application linked with the message sharing system so that the scan data is the post to a predetermined destination through the message sharing system
wherein, when the input data transmitted from the image processing apparatus corresponds to confirmation data that the web application has issued and stored in a storage for a user account belonging to the message sharing system, the scan data transmitted from the image processing apparatus is posted, by the web application, to the predetermined destination associated with the confirmation data through the message sharing system, and wherein the predetermined destination is a communication space in the message sharing system or a direct message to the user account.

9. A method of controlling an image processing apparatus, the method comprising:

receiving an input of data from a user for a scan service using a message sharing system; and transmitting the input data and scan data generated using the scanner to a web application linked with the message sharing system so that the scan data is the post to a predetermined destination through the message sharing system, wherein, when the input data transmitted from the image processing apparatus corresponds to confirmation data that the web application has issued and stored in a storage for a user account belonging to the message sharing system, the scan data transmitted from the image processing apparatus is posted, by the web application, to the predetermined destination associated with the confirmation data through the message sharing system, and wherein the predetermined destination is a communication space in the message sharing system or a direct message to the user account.

10. A non-transitory storage medium which stores a computer program for a method of controlling an image processing apparatus, the method comprising:

receiving an input of data from a user for a scan service using a message sharing system; and transmitting the input data and scan data generated using the scanner to a web application linked with the message sharing system so that the scan data is the post to a predetermined destination through the message sharing system, wherein, when the input data transmitted from the image processing apparatus corresponds to confirmation data that the web application has issued and stored in a storage for a user account belonging to the message sharing system, the scan data transmitted from the image processing apparatus is posted, by the web application, to the predetermined destination associated with the confirmation data through the message sharing system, and wherein the predetermined destination is a communication space in the message sharing system or a direct message to the user account.

* * * * *